United States Patent [19]

Nakanishi et al.

[11] Patent Number: 5,940,857
[45] Date of Patent: Aug. 17, 1999

[54] INSTRUCTION CACHE MEMORY APPARATUS WITH ADVANCED READ FUNCTION THAT PREDICTS WHETHER TO READ OUT A NEXT INSTRUCTION BLOCK INCLUDING AN ADDRESS REGISTER, A COUNTER AND A SELECTOR

[75] Inventors: Chikako Nakanishi; Hideki Ando, both of Hyogo, Japan

[73] Assignee: Mitsubishi Denki Kabushiki Kaisha, Tokyo, Japan

[21] Appl. No.: 08/916,707

[22] Filed: Aug. 25, 1997

Related U.S. Application Data

[63] Continuation of application No. 08/520,720, Aug. 29, 1995, abandoned.

[30] Foreign Application Priority Data

Aug. 30, 1994 [JP] Japan .................................... 6-204918
Jan. 12, 1995 [JP] Japan .................................... 7-003529

[51] Int. Cl.[6] ....................................................... G06F 9/38
[52] U.S. Cl. ......................... 711/137; 711/213; 395/383; 395/584; 395/586
[58] Field of Search .................................. 711/137, 213; 395/583, 383, 584–586, 580, 376

[56] References Cited

U.S. PATENT DOCUMENTS

| | | | |
|---|---|---|---|
| 4,714,994 | 12/1987 | Oklobdzija et al. ..................... | 395/383 |
| 5,197,136 | 3/1993 | Kimura et al. ........................... | 395/585 |
| 5,230,068 | 7/1993 | Van Dyke et al. ...................... | 711/137 |
| 5,317,718 | 5/1994 | Jouppi ..................................... | 711/137 |
| 5,412,786 | 5/1995 | Kusano ................................... | 395/587 |
| 5,414,822 | 5/1995 | Saito et al. .............................. | 395/587 |
| 5,440,704 | 8/1995 | Itomitsu et al. ........................ | 395/586 |
| 5,442,756 | 8/1995 | Grochowski et al. .................. | 395/585 |
| 5,506,976 | 4/1996 | Jaggar ..................................... | 395/585 |
| 5,574,871 | 11/1996 | Hoyt et al. .............................. | 395/376 |

OTHER PUBLICATIONS

1993 IEEE International Conference on Computer Design: VLSI In Computers & Processors, pp. 44–49, Honesty C. Young, et al., "An Intelligent I–Cache Prefetch Mechanism".

*Primary Examiner*—Eddie P. Chan
*Assistant Examiner*—Hong Kim
*Attorney, Agent, or Firm*—Oblon, Spivak, McClelland, Maier & Neustadt, P.C.

[57] ABSTRACT

An instruction cache memory provides a low probability of occurrence of cache error. The instruction cache memory includes an advance read function with an instruction cache for providing/receiving instruction formation in block unit to/from a main memory, an instruction analysis section for predicting whether it is necessary to read out a next block from the main memory by analyzing the instructions included in the block read out from the main memory presently being transferred to the instruction cache, and circuits for reading out the next block from the main memory to transfer to the instruction cache when predicted to be necessary by the instruction analysis section. Prediction is done by judging if a branch predict signal produced within the instruction cache memory is present or not, judging the branch destination to be within the block or in the next block when the branch instruction is detected, and judging whether the branch operation is a forward branch or a backward branch.

14 Claims, 23 Drawing Sheets

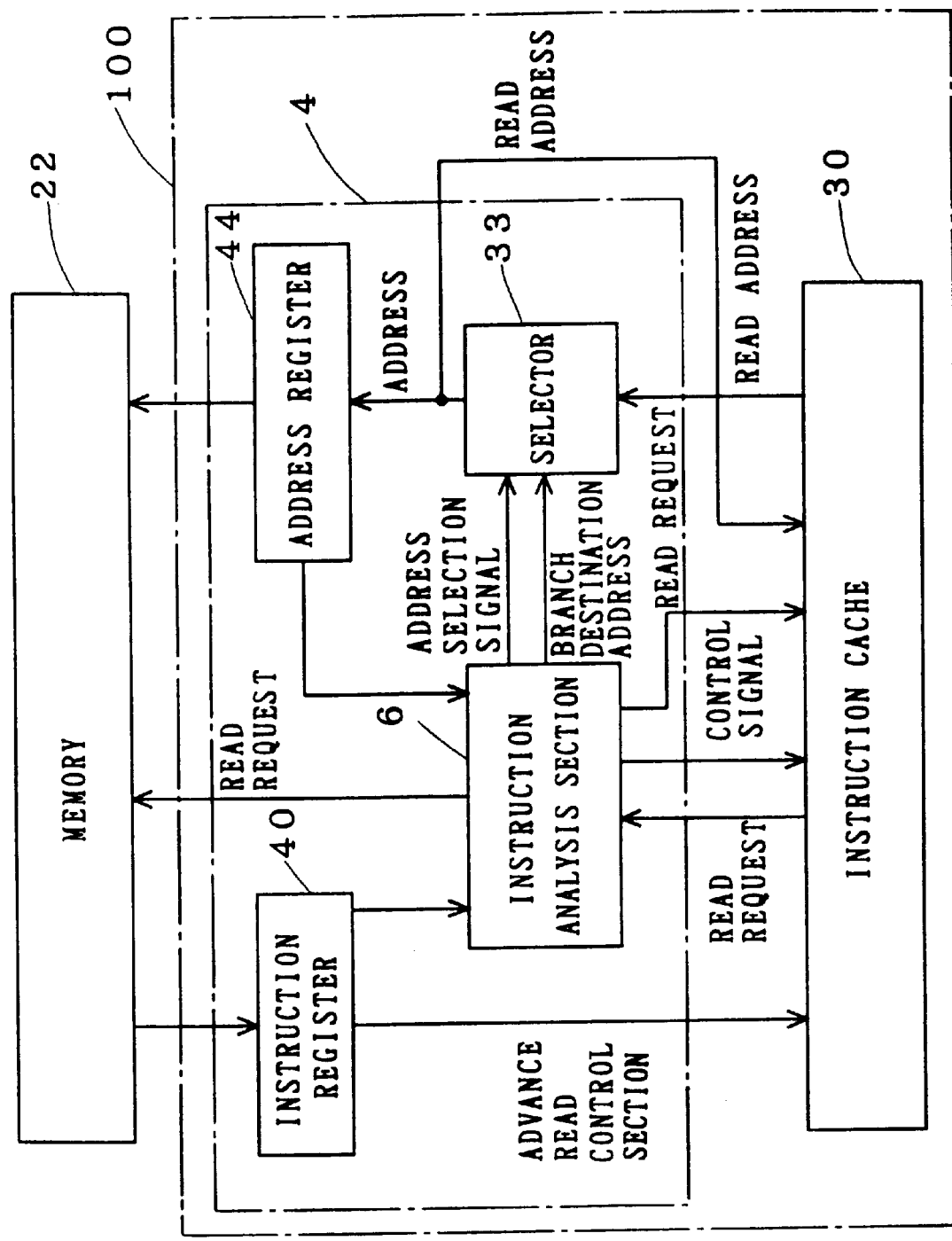
F I G. 17

INSTRUCTION CACHE MEMORY APPARATUS WITH ADVANCED READ FUNCTION THAT PREDICTS WHETHER TO READ OUT A NEXT INSTRUCTION BLOCK INCLUDING AN ADDRESS REGISTER, A COUNTER AND A SELECTOR

This application is a continuation of application Ser. No. 08/520,720, filed on Aug. 29, 1995, now abandoned.

BACKGROUND OF THE INVENTION

1. Field of the Invention

The present invention relates to an instruction cache memory with advance read function positioned between a processing device such as microprocessor and a main memory, for buffering the difference in the operating speed of the two, and more particularly to an improvement of its hit rate.

2. Description of the Background Art

In an ordinary processor, the memory layers are composed of several levels. The control of such memory layers is effected in the unit of every two adjacent levels.

Referring to FIG. 25, a memory device 200 closer to the CPU 18 is called a caches, and the remoter memory device is a memory 22. At these two levels, the minimum unit of data subject to memory control is called a block. Data giving and receiving between cache and memory is effected in the block unit.

The CPU 18 sends an access request composed of control signal (load/store) and address, to the cache 200. The cache 200, when holding inside the data of the address indicated by the access request, promptly outputs data to the CPU 18, and when not holding and the access to the cache is a failure, it sends a read request composed of control signal (load/store) and address to the memory 22, and the data of the address indicated by the read request is fetched from the memory 22, and transferred to the CPU 18.

A failure of access to the cache (the objective data not found in the cache) is called an error. The error rate is the rate of access failure. The hit rate is an inverse number of the error rate, and means the successful access rate. The error penalty refers to the sum of the time for replacing the block in the cache 200 by the block transferred from the memory 22, and the time for sending the data to the CPU 18 outputting the access request to the block.

Generally, the CPU time showing the processor performance is given in the following formula.

CPU time=number of execution instructions×(number of clocks per instruction (CPI)+average number of errors per instruction×error penalty)×clock cycle time As known from this formula, even in the same CPU, the performance varies with the cache behavior. In the CPU with low CPI and high clock frequency, lowering of performance due to cache error is more serious. This is because the rate of effect of cache error increases as the CPI value is smaller.

Or, if the CPU is different, the memory chips used in the main memory are often of the same kind. Therefore, regarding the main memory access time alone, there is almost no difference among computers. The error penalty is expressed as the value of the time necessary for processing the error represented by the number of CPU clocks. If the access time of the main memory is same, the error penalty value increases as the number of clocks of CPU becomes higher. Accordingly, in the CPU with high clock frequency, lowering of performance due to cache error is more serious.

It is thus known that the cache error has a large effect on the performance of the processor. That is, the probability of occurrence of errors has a large importance on the system performance.

The cache memory may be divided into the instruction (exclusive) cache and data (exclusive) cache. By using independent caches for the instruction and data, a constitution optimum for handling of instruction and data can be set up, and hence it is advantageous for enhancement of performance of the entire system. In particular, in the instruction cache memory, by more deeply studying the mode of execution of a series of instructions, there is a possibility of further optimizing the operation of the instruction cache memory.

SUMMARY OF THE INVENTION

A first aspect of the invention relates to an instruction cache memory with advance read function comprising an instruction auxiliary memory device disposed between a main memory and a processing device for buffering the difference in the operation speed thereof, and giving/receiving instruction information in block unit to/from the main memory in response to an access request given from the processing device, instruction analysis means for analyzing an instruction included in a read block readout from the main memory being transferred to the instruction auxiliary memory device, and predicting whether it is necessary or not to readout a next block succeeding the read block from the main memory, and next block read means for reading out the next block from the main memory, when it is predicted necessary to read out the next block, in response to prediction of the instruction analysis means, thereby storing into the instruction auxiliary memory device.

A second aspect of the invention relates to an instruction memory cache with advance read function, wherein the instruction analysis means comprises prediction means for detecting there is no branch predict instruction which is an instruction that is predicted that it will branch, in the read block, and predicting it is necessary to read out the next block.

A third aspect of the invention relates to an instruction memory cache with advance read function, wherein the instruction analysis means comprises prediction means for detecting it is not an instruction which is predicted that it will branch out of the region of the read block and the next block, and predicting it is necessary to read out the next block.

A fourth aspect of the invention relates to an instruction memory cache with advance read function, wherein the instruction analysis means comprises branch predict instruction detecting means for detecting from the read block a branch predict instruction which is an instruction that is predicted that it will branch from the read block, forward branch judging means for judging whether the branch predict instruction is a forward branch to branch to an address larger than the own address or not, and predict means for predicting it is necessary to read out the next block when the branch judging means judges that the branch predict instruction is the forward branch.

A fifth aspect of the invention relates to an instruction memory cache with advance read function, wherein a specific instruction is predetermined, and the instruction analysis means comprises predict means for detecting the presence of the specific instruction in the read block, and predicting it is necessary to readout the next block.

A sixth aspect of the invention relates to an instruction cache memory with advance read function comprising an instruction auxiliary memory device disposed between a main memory and a processing device for buffering the difference in the operation speed thereof, and giving/receiving instruction information in block unit to/from the main memory in response to an access request given from the processing device, instruction analysis means for analyzing an instruction included in a read block read out from the main memory being transferred to the instruction auxiliary memory device, calculating a branch destination address when a branch instruction is included, and judging if it is necessary to read out a branch destination block which is a block including an instruction of the branch destination address from the main memory, and next block read means for reading out the branch destination block from the main memory, when it is judged necessary to read out the branch destination block, in response to judgement of the instruction analysis means, thereby storing into the instruction auxiliary memory device.

A seventh aspect of the invention relates to an instruction memory cache with advance read function, wherein the instruction analysis means comprises judging means for judging it is necessary to read out the branch destination block from the main memory when the branch instruction is an absolute branch instruction or program counter relative branch instruction.

An eighth aspect of the invention relates to an instruction memory cache with advance read function, wherein the instruction analysis means comprises judging means for judging it is necessary to read out the branch destination block from the main memory when the branch destination address is an address out of the region of the read block.

A ninth aspect of the invention relates to an instruction memory cache with advance read function, wherein the instruction analysis means comprises branch predict means for predicting whether the branch instruction is highly possible to branch or not, and judging means for judging it is necessary to read out the branch destination block from the main memory when the branch predict means predicts that the branching possibility of the branch instruction is high.

A tenth aspect of the invention relates to an instruction memory cache with advance read function, wherein the branch predict means comprises memory means for storing the type of branch instruction high in possibility to branch, the branch predict means predicting that the branching possibility of the branch instruction is high when the branch instruction is the type stored in the memory means.

An eleventh aspect of the invention relates to an instruction memory cache with advance read function, wherein the branch predict means predicts the branching possibility of the branch instruction is high when the branch destination address is smaller than the address in which the branch instruction is stored.

A twelfth aspect of the invention relates to an instruction memory cache with advance read function, wherein the type of branch instruction high in the branching possibility is preliminarily provided with branch information of specific bits for indicating it, and the branch predict means predicts that the branching possibility of the branch instruction is high when the branch information is found in the branch instruction.

A thirteenth aspect of the invention relates to an instruction memory cache with advance read function, wherein a specific instruction is predetermined, and the instruction analysis means comprises judging means for judging it is necessary to read out the branch destination block from the main memory when detecting the presence of the specific instruction in the read block.

A fourteenth aspect of the invention relates to an instruction memory cache with advance read function comprising an instruction auxiliary memory device disposed between a main memory and a processing device for buffering the difference in the operation speed thereof, and giving/receiving instruction information in block unit to/from the main memory in response to an access request given from the processing device, the instruction auxiliary memory device fetching block information from the main memory when the information of the block indicated by the access request is not held, and advance read control means for analyzing an instruction included in a read block read out from the main memory and transferred into the instruction auxiliary memory device, calculating a branch destination address when a branch instruction is included, and outputting a pseudo access request equivalent to the access request for instructing to read out a branch destination block which is a block containing an instruction of a corresponding branch destination address.

According to the first aspect of the instruction memory cache with advance read function of the invention, the instruction analysis means analyzes the instruction included in the read block which is a block being read out from the main memory and transferred into the instruction auxiliary memory device, and predicts if it is necessary or not to read out a next block which is a block succeeding the read block, from the main memory. The next block read means reads out the next block from the main memory when it is predicted necessary to read out from the main memory by the instruction analysis means, and transfers to the instruction auxiliary memory device.

Therefore, the instruction cache memory with advance read function of the first aspect prevents an error when an access request to next block occurs, by transferring the next block as required, prior to execution of instruction of the read block.

At this time, since the next block is read out on the basis of the prediction by the instruction analysis means whether it is necessary to read out the next block from the main memory or not, possibility of reading out an unnecessary block is low.

As a result, the instruction cache memory of low probability of occurrence of cache error is obtained.

According to the second aspect of the instruction memory cache with advance read function of the invention, when a branch predict instruction is not present in the read block, the predict means of the instruction analysis means predicts it necessary to read out the next block.

That is, if a branch instruction is present in the read block, if a next block is read out, the possibility is low that this block is accessed, and therefore the predict means predicts that it is necessary to read out the next block only in the absence of branch predict instruction high in possibility of access of the next block. Hence, the possibility of reading out unnecessary block by the next block read means is lowered.

As a result, the probability of occurrence of cache error is low, and an instruction cache memory capable of enhancing the performance of the entire system can be obtained.

According to the third aspect of the instruction memory cache with advance read function of the invention, the predict means of the instruction analysis means predicts it necessary to read out the next block even if there is a branch predict instruction which is an instruction predicted to branch, unless it is an instruction predicted to branch off outside the range of the present read block and next block.

That is, the predict means predicts it necessary to read out the next block even in the case of branch predict instruction, if it is an instruction to branch into the read block and next block because the possibility of the next block to be accessed is high.

As a result, an instruction cache memory with low probability of occurrence of cache error is obtained.

According to the fourth aspect of the instruction memory cache with advance read function of the invention, when a branch predict instruction included in the read block is detected by the branch predict instruction detecting means, the detected branch predict instruction is judged to be forward branch or not by the forward branch judging means. Besides, by the predict means, it is predicted necessary to read out the next block when the detected branch predict instruction is judged to be forward branch.

That is, even in the branch predict instruction, in the case of backward branch, it often branches into other block, but in the forward branch, probability of branching into other block is low, and hence the predict means predicts it necessary to read out the next block.

As a result, by predicting depending on the type of the branch predict instruction, probability of occurrence of cache error is slow, and hence an instruction cache memory capable of enhancing the performance of the entire system can be obtained.

According to the fifth aspect of the instruction memory cache with advance read function of the invention, the predict means of the instruction analysis means detects the presence of a specific instruction in the read block, and predicts it necessary to read out the next block.

Therefore, by including the specific instruction in a block that is preliminarily known not to branch off, or a block of high probability thereof, or in a block necessary to read out the next block or high in its necessity, the next block can be read out conveniently to be ready for access.

As a result, an instruction cache memory with low probability of occurrence of cache error is obtained.

According to the sixth aspect of the instruction memory cache with advance read function of the invention, the instruction analysis means analyzes the instruction included in the read block being read out from the main memory and transferred to the instruction auxiliary memory device, calculates the branch destination address if a branch instruction is included, and judges whether necessary or not to read out the branch destination block or the block including the instruction of the branch destination address from the main memory. The branch destination block read means reads out the branch destination block from the main memory when it is judged necessary to read out the branch destination block, and stores it in the instruction auxiliary memory device.

Therefore, in the instruction cache memory with advance read function of the sixth aspect is designed to prevent error if an access request to branch destination block occurs by transferring the branch destination block as required, prior to execution of instruction of the read block.

At this time, the branch destination block is read out on the basis of the judgement by the instruction analysis means whether or not necessary to read out the branch destination block from the main memory, and hence possibility of reading out unnecessary branch destination block is low.

As a result, an instruction cache memory with low probability of occurrence of cache error is obtained.

According to the seventh aspect of the instruction memory cache with advance read function of the invention, the judging means of the instruction analysis means judges it necessary to read out the branch destination block from the main memory when the branch instruction is an absolute branch instruction or program counter relative branch instruction.

When the absolute branch instruction or program counter relative branch instruction is present in the read block, possibility of the branch destination block being accessed is high, and hence the precision of the judgement of the judging means is high.

As a result, while efficiently fetching the branch destination block into the instruction auxiliary memory device, the probability of occurrence of cache memory is low, and an instruction cache memory capable of enhancing the performance of the entire system can be obtained.

According to the eighth aspect of the instruction memory cache with advance read function of the invention, the judging means of the instruction analysis means judges it necessary to read out the branch destination block from the main memory when the branch destination address is an address outside the range of the read block.

That is, if the branch instruction is present, the judging means judges it not necessary to read out the branch destination block in the case of an instruction to branch off into the read block, and hence the judging precision is further enhanced.

As a result, while efficiently fetching the branch destination block into the instruction auxiliary memory device, an instruction cache memory further lower in probability of occurrence of cache error is obtained.

According to the ninth aspect of the invention, the instruction memory cache with advance read function comprises branch predict means for predicting whether the possibility of the branch instruction to branch off is high or not, and judging means for judging it necessary to read out the branch destination block from the main memory when the branch predict means predicts the branching possibility of the branch instruction to be high.

That is, the judging means judges whether necessary or not to read out the branch destination block from the main memory on the basis of the prediction by the branch predict means, and hence the judging precision is further enhanced.

As a result, while efficiently fetching the branch destination block into the instruction auxiliary memory device, an instruction cache memory further lower in probability of occurrence of cache error is obtained.

According to the tenth aspect of the instruction memory cache with advance read function of the invention, the branch predict means predicts the branching possibility of the branch instruction is high when the branch instruction is a type high in branching possibility stored in the memory means, so that branch prediction of high precision is realized.

According to the eleventh aspect of the instruction memory cache with advance read function of the invention, the branch predict means predicts the branching possibility is high in the case of branch instruction of which branch destination address is smaller than the stored address of the branch instruction, that is, in the case of backward branch, so that prediction of precision is realized.

According to the twelfth aspect of the instruction memory cache with advance read function of the invention, the type of the branch instruction high in branching possibility is preliminarily provided with branch information of specific bits indicating it, and the branch predict means predicts the branching possibility of branch instruction is high when the branch information is present in the branch instruction, so that prediction of high precision is realized.

According to the thirteenth aspect of the instruction memory cache with advance read function of the invention, the judging means of the instruction analysis means judges it necessary to read out the branch destination block from the main memory when presence of specific instruction is detected in the read block.

Therefore, by including the specific instruction in a block that is preliminarily known to branch off, or a block of high probability thereof, or in a block necessary to read out the branch destination block or high in its necessity, the branch destination block can be read out conveniently to be ready for access.

As a result, while efficiently fetching the branch destination block into the instruction auxiliary memory device, an instruction cache memory low in probability of occurrence of cache error is obtained.

According to the fourteenth aspect of the instruction memory cache with advance read function of the invention, the advance read control means analyzes the instruction included in the read block being read out from the main memory and transferred to the instruction auxiliary memory device, calculates the branch destination address when the branch instruction is included, and outputs a pseudo access request equivalent to an access request to indicate reading out of the branch destination block which is a block including the instruction of the corresponding branch destination address, to the instruction auxiliary memory device.

Therefore, since the advance read control means accesses at the branch destination block to the instruction auxiliary memory device when a branch instruction is present in the read block, when branch destination block is not present in the instruction auxiliary memory device, the instruction auxiliary memory device requests reading of the branch destination block to the main memory and automatically fetches the branch destination block, and when branch destination block is present in the instruction auxiliary memory device, it does not output a read request to the branch destination block, and hence does not access to the main memory at all.

As a result, when a branch destination block is already present in the instruction auxiliary memory device, the memory access is not done, and therefore the branch destination block can be efficiently transferred from the main memory to the instruction auxiliary memory device, and hence an instruction cache memory low in probability of occurrence of cache error is obtained.

It is therefore an object of the present invention to solve the conventional problems and provide an instruction cache memory with a low probability of occurrence of cache error.

These and other objects, features, aspects and advantages of the present invention will become more apparent from the following description of the present invention when taken in conjunction with the accompanying drawings.

BRIEF DESCRIPTION OF THE DRAWINGS

FIG. 17 is a block diagram showing a constitution of an instruction cache memory with advance read function in a fifth preferred embodiment of the invention.

DESCRIPTION OF THE PREFERRED EMBODIMENTS

The invention is specifically described below by reference to three preferred embodiments. The invention, meanwhile, has various aspects, and the following three preferred embodiments are realized by combining such aspects in specific combinations. It must be therefore understood that other combinations are also included in the scope of the invention as far as specified in the claims thereof.

<First preferred embodiment>

A first preferred embodiment relates to an instruction cache with advance read function for detecting presence or absence of a branch predict instruction in one block being read out, when a block of instruction information is read out from the memory in response to a read request from an instruction cache which is an instruction auxiliary memory device, and reading out a next block from the memory when not present, and transferring to the instruction caches.

When a branch predict instruction is not included in the instruction information in one block, the probability of output of access request to a next block is very high. Therefore, by reading out the next block from the memory and transferring to the instruction cache in advance, an error does not occur when an access request to next block occurs, and hence the hit rate is raised. Besides, when there is a branch predict instruction in one block being read out, it is highly possible that the next block is not used if being read out. In such a case, the next block is not read out, and wasteful transfer to the cache memory is avoided. Moreover, the block of higher frequency of access already stored in the cache memory will not be erased from the instruction cache by reading of next block. Hence, the probability of cache error is further lowered.

Figure 1:
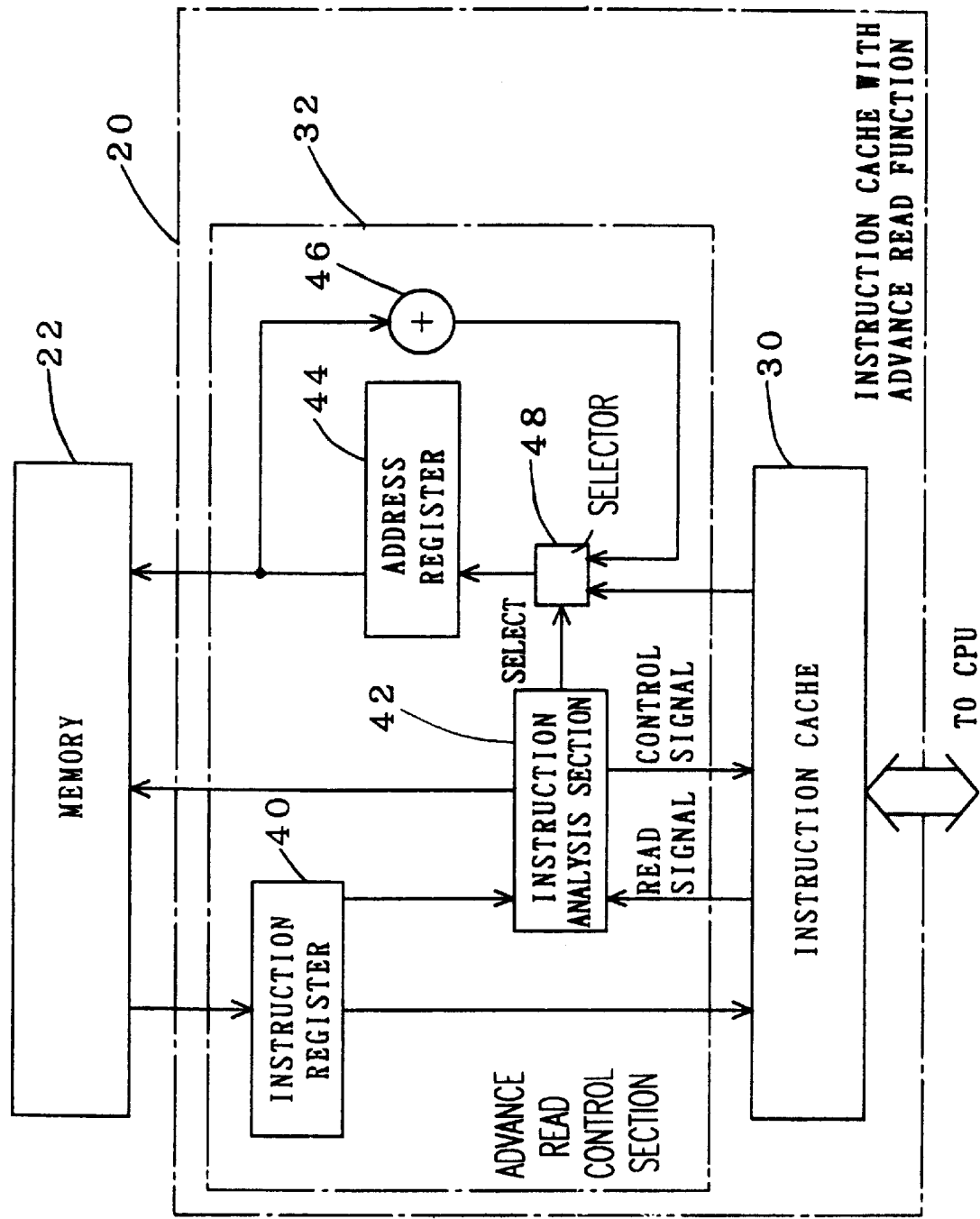
FIG. 1 is a block diagram showing a constitution of an instruction cache memory with advance read function in a first preferred embodiment of the invention.

FIG. 1 is a block diagram showing a constitution of the instruction cache memory with advance read function in the first preferred embodiment of the invention. As shown in the diagram, a memory 22 is a memory device composing the lower portion of the memory layers, and an instruction cache 30 is a memory device composing the upper portion. In particular, the instruction cache 30 is a cache for storing instructions only, and is provided for buffering the difference between the execution speed of instruction by CPU, and the reading speed from the memory 22.

Generally, the instruction cache 30 receives an access request of instruction from the CPU. The instruction cache 30, when the requested data is not found in the instruction cache 30, transfers a read signal to the memory 22 and an address showing the block to be read out (read block) to the memory 22. The practical method of transfer is described later.

Referring to FIG. 1, the instruction cache with advance read function 20 of the invention is provided between the memory 22 and the processor not shown. The instruction cache with advance read function 20 comprises and instruction cache 30 which is an instruction auxiliary memory device for reading out and storing instructions in block unit from the memory 22, and an advance read control section 32 for controlling advance read of the instruction cache 30.

The advance read control section 32 comprises an address register 44 for storing the address of the block being read out from the memory 22, a counter 46 for adding the value held in the address register 44 by the portion of one block, a selector 48 for selecting the output of the instruction cache 30 or counter 46 in response to a given selection signal and applying to the address register 44, an instruction register 40 for once storing instructions of one block being read out from the address specified by the value stored in the address register 44 and applying to the instruction cache 30, and an instruction analysis unit 42 for judging if a branch predict instruction is included in the instructions of one block stored in the instruction register 40, and, if not included, controlling the selector 48, memory 22, and instruction cache 30 to transfer instructions of next block from the memory 22 to the instruction cache 30. Of the advance read control section 32, the portions other than the instruction analysis section correspond to next block read means.

Figure 2:
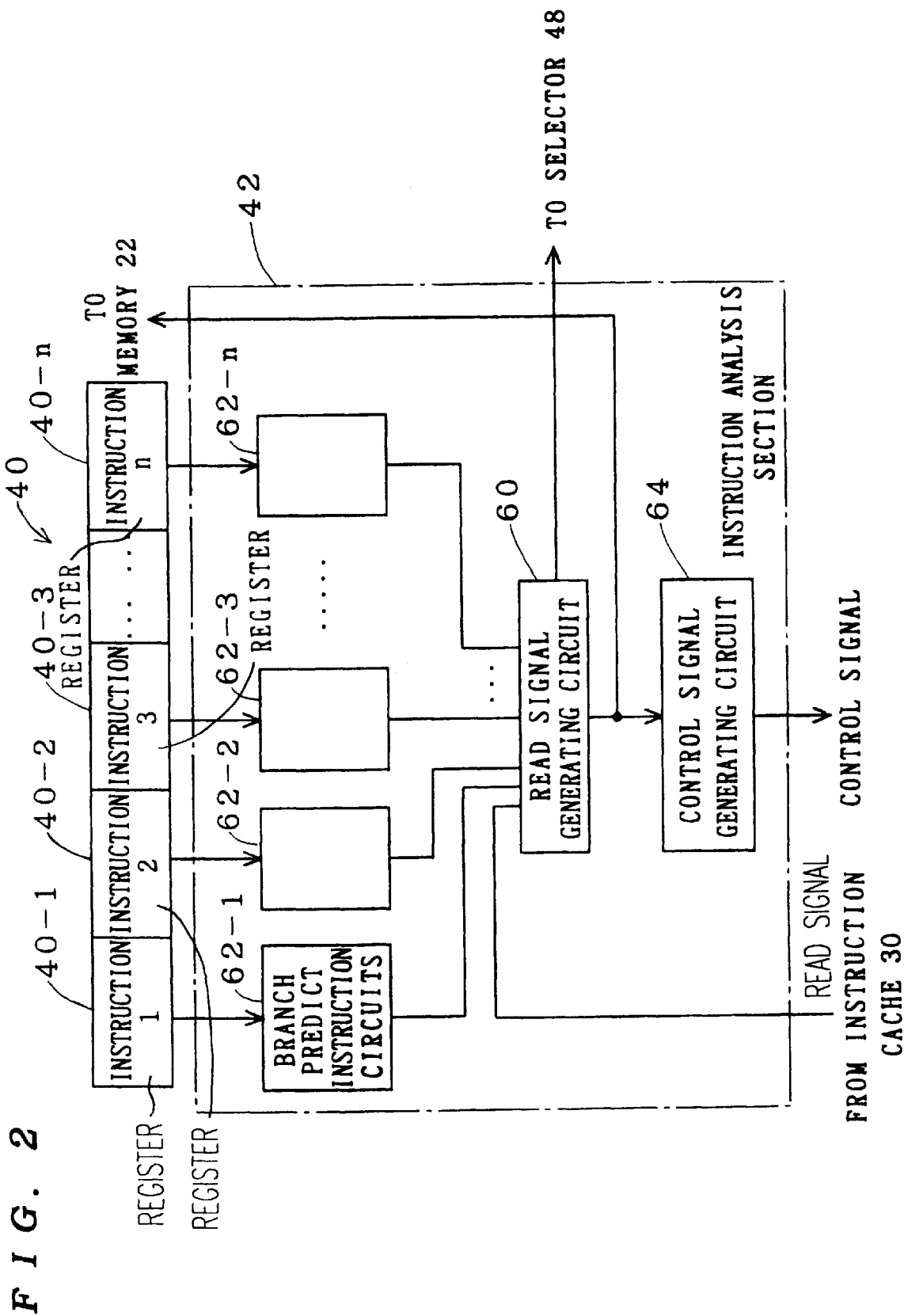
FIG. 2 is a block diagram showing an internal structure of an instruction analysis section in the first preferred embodiment.

FIG. 2 is a block diagram showing an internal structure of the instruction register 40 and instruction analysis section 42. As shown in the diagram, the instruction register 40 is composed of n registers 40-1 to 40-n for storing n instructions 1 to n, respectively.

The instruction analysis section 42 is connected to the registers 40-1 to 40-n individually, and comprises branch predict instruction detecting circuits 62-1 to 62-n for detecting if a branch predict instruction is included in each register, a read signal generating circuit 60 for outputting a selection signal to the selector 48 and a read signal to the memory 22 in response to the outputs of the branch predict instruction detecting circuits 62-1 to 62-n, and the read signal from the instruction memory 30, and a control signal generating circuit 64 for generating a control signal to the instruction cache 30 in response to the output of the read signal generating circuit 60. The read signal generating circuit 60 functions to apply a selection signal for selecting the output of the counter 46 in FIG. 1 to the selector 48 when signal showing detection of branch predict instruction is not given from any one of the branch predict instruction detecting circuits 62-1 to 62-n.

The branch predict signal detecting circuits 62-1 to 62-n shown in FIG. 2 are identical in constitution. Hereinafter, m refers to an arbitrary integer from 1 to n.

Figure 3:
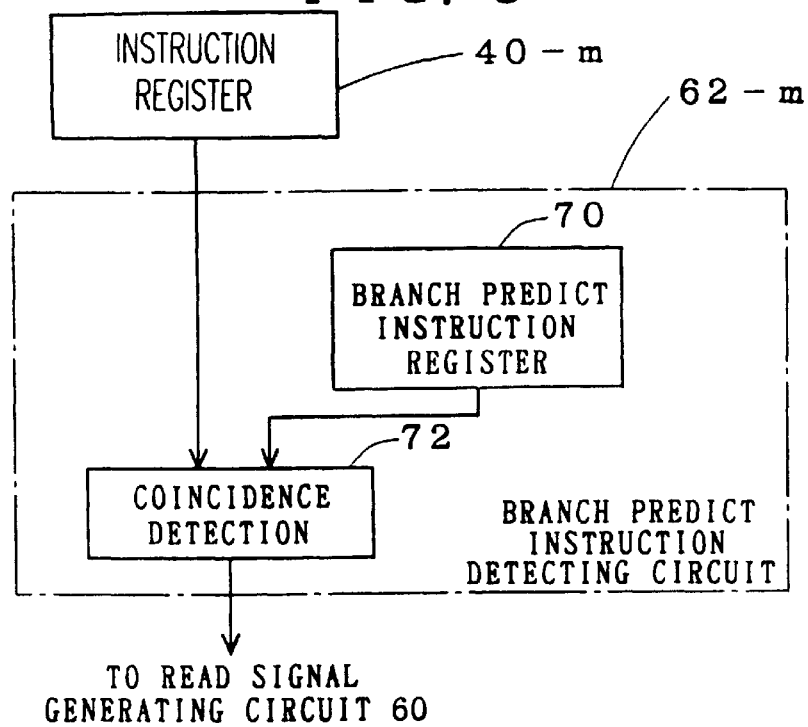
FIG. 3 is a block diagram showing an internal structure of a branch predict instruction detecting circuit.

FIG. 3 is an explanatory diagram showing the internal structure of branch predict instruction detecting circuit 62-m. As shown in the diagram, the branch predict instruction detecting circuit 62-m comprises a branch predict instruction register 70 for preliminarily storing branch predict instructions, and a coincidence detecting circuit 72 connected to both instruction register 40-m and branch predict instruction register 70 for detecting if the instruction stored in the register 40-m and the branch predict instruction stored in the branch predict instruction register 70 coincide with each other or not, and applying a coincidence detection signal to the read signal generating circuit 60.

Figure 4:
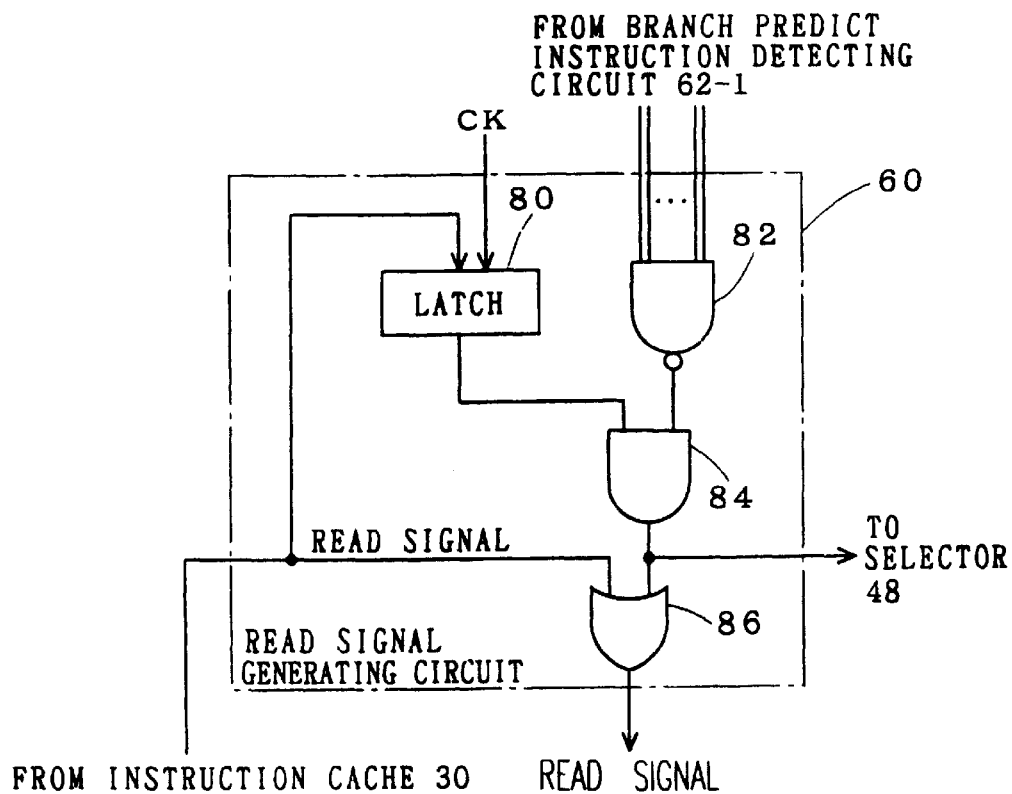
FIG. 4 is a block diagram showing an internal structure of a read signal generating circuit.

FIG. 4 is a circuit diagram showing an internal structure of the read signal generating circuit 60. As shown in the diagram, the read signal generating circuit 60 comprises a NAND gate 82 having n inputs connected to the branch predict instruction detecting circuits 62-1 to 62-n, a latch circuit 80 for one latching the read signal given from the instruction cache 30, an AND gate 84 having two inputs connected to the output of the NAND gate 82 and output of the latch circuit 80, and an OR gate 86 having two inputs for receiving the output of the AND 84 and the read signal from the instruction cache 30. The latch 80 further receives a clock CK for operation of the CPU 18, and stores the read request obtained from the instruction cache 30 in synchronism with this clock CK.

The output of the AND gate 84 is the selection signal to the selector 48, and the output of the OR gate 86 becomes a read signal to the memory 22.

Hereinafter is explained the operation of the instruction cache with advance read function of the first preferred embodiment shown in FIG. 1 to FIG. 4.

Suppose data not existing in the instruction cache 30 is requested from the CPU. In this case, the instruction cache 30 gives a read signal to the instruction analysis section 42. The instruction cache 30 also gives an address of the block corresponding to the instruction to the selector 48. The instruction analysis section 42 receives a read signal from the instruction cache 30, and controls the selector 48 to select the address outputted from the instruction cache 30. The selector 48 stores the output address from the instruction cache 30 to the address register 44.

The memory 22 transfers the block shown by the address register 44 to the instruction register 40. The instruction cache 30 further stores data for the portion of one block stored in the instruction register 40, in response to the control signal given from the instruction analysis section 40.

The counter 46 add the value stored in the address register 44 by the portion of one block, and gives again to the selector 48.

The instruction analysis section 42 judges if there is any branch predict instruction which is an instruction predicted to branch off, among the instructions of one block stored in the instruction register 40 as mentioned later. If branch predict instruction is not found, the instruction analysis section 42 controls the selector 48, and selects the output of the counter 46. The output of the selector 48 is stored in the address register 44. The instruction analysis section 42 also gives a read signal to the memory 22. Therefore, the memory 22 transfers a block one block next as specified by the address register 44 to the instruction register 40. The instruction analysis section 42 further gives a control signal to the instruction cache 30, and stores the content of the instruction register.

Referring now to FIG. 2 to FIG. 4, the instruction analysis section 42 operates as follows.

Referring in particular to FIG. 3, the coincidence detecting circuit 72 of the branch predict instruction detecting circuit 62-m judges whether the instruction stored in the register 40-m and the branch predict instruction stored in the branch predict instruction register 70 coincide with each other or not, and when coinciding, it generates a branch signal and applies to the read signal generating circuit 60. Referring again to FIG. 2, this processing is done in each one of the n branch predict instruction detecting circuits 62-1 to 62-n.

Referring to FIG. 4, the NAND gate 82 does not output read signal if any one of the signals given from the branch predict instruction detecting circuits 62-1 to 62-n is a branch signal, and otherwise outputs a read signal.

The latch circuit 80 once latches the detection signal from the instruction cache 30 in synchronism with the clock CK, and gives to the AND circuit 84. Therefore, the AND gate 84 gives the output of the NAND gate 82 to the selector 48 and OR gate 86 one clock later than the read signal being given first from the instruction cache 30 to the memory 22. When none of the signals from the branch predict instruction detecting circuits 62-1 to 62-n is branch signal, a read signal is outputted from the AND gate 84, and the selector 48 shown in FIG. 1 selects the output of the counter 46.

Moreover, the OR gate 86 calculates the OR of the read signal from the instruction cache 30 and output of the AND gate 84, and gives it to the memory 22 as read signal. Therefore, the memory 22 gives a next block of the read block specified first from the instruction cache 30 to the instruction register 40. The instruction register 30 stores the output of the instruction register 40.

The control signal generating circuit 64 shown in FIG. 2 is intended to generate a control signal for storing the output of the instruction register 40 to the instruction cache 30 to give to the instruction cache 30 when data of one block is stored in the instruction register 40 after the read signal to the memory 22 is outputted. The output of the memory 22 may be directly stored without resort to instruction register 40.

Referring again to FIG. 2, in at least one of the branch predict instruction detecting circuits 62-1 to 62-n, when the instruction stored in the corresponding register is detected to coincide with the branch predict instruction, the output of the NAND gate 82 shown in FIG. 4 is a value not indicating the reading. There is no selection signal to the selector 48, and read signal is not outputted unless next read signal is given from the OR gate 86. Therefore, transfer of next block is not effected.

In the instruction cache, the data requested from the CPU is high in continuity. It is therefore highly possible that the next block of the present request is requested. By transferring the next block to the instruction cache beforehand as in this preferred embodiment, the possibility of occurrence of cache error is lowered, which leads to enhancement of system performance. In the preferred embodiment, furthermore, by the operation of the instruction analysis section 42, it is predicted whether it is necessary to transfer the next block or not, and the next block is transferred only when necessary. It therefore prevents transfer of unnecessary data. Besides, when the instruction cache 30 is full, if data is transferred newly from the memory 22, it is necessary to erase the presently stored block. To store unnecessary data, the risk of erasure of the presently stored block, a block highly possible to be necessary, is small, and hence the probability of cache error is further lowered.

<Second preferred embodiment>

A second preferred embodiment of the invention is described below. In the second preferred embodiment, when a read request to the memory is outputted from the instruction cache, the requested read block is one read out from the memory and stored. Furthermore, it is judged if there is a branch instruction in the stored read block, and when branch instruction is not present, the next block is continuously read out same as in the first preferred embodiment. If a branch instruction is present, when the branch instruction is forward branch of branching into a larger address than he own address, or when the branch destination address of the branch instruction is within the read block or next block, the next block is read out. Generally, when the branch instruction is a forward branch, branching occurs at a possibility of nearly fifty percent, and in the case of backward branch of branching into a smaller address than the own address, branching occurs in most cases. In the case of backward branch, predicting to branch, it may be handled as branch predict instruction, and in the case of forward branch, it may be regarded not to branch. If a branch instruction is present, when the branch destination address is within read block or next block, it is effective to read out the next block in advance. Therefore, in this second preferred embodiment, if a branch predict instruction is included in the block being read out, it is effective to read out the next block in advance, which is effective to lower the probability of the cache error.

Figure 5:
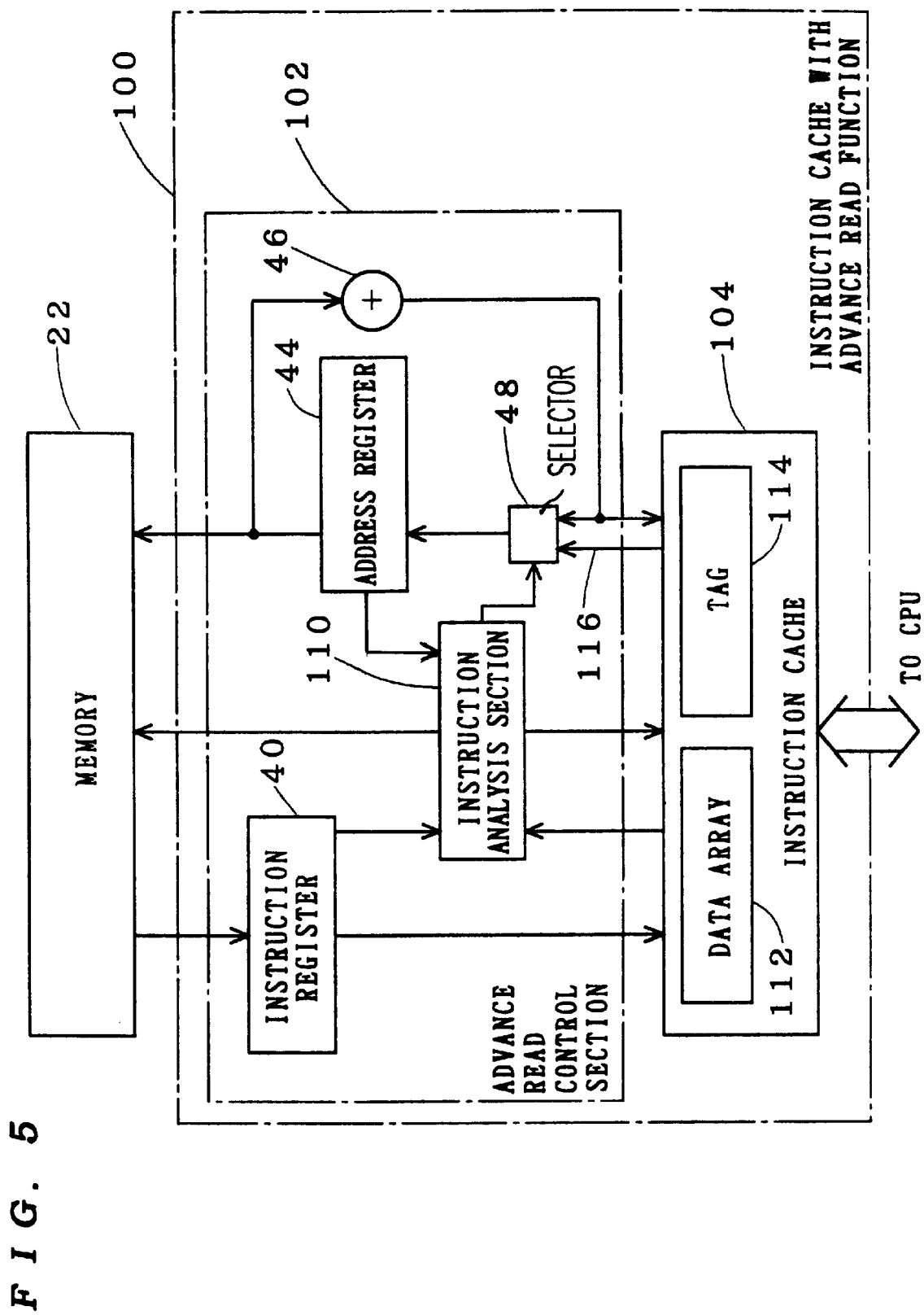
FIG. 5 is a block diagram showing a constitution of an instruction cache memory with advance read function in a second preferred embodiment of the invention.

FIG. 5 is a block diagram showing a constitution of an instruction cache memory with advance read function in the second preferred embodiment of the invention. As shown in the diagram, an instruction cache with advance read function 100 of the second preferred embodiment is provided between the CPU not shown, and the memory 22. The instruction cache with advance read function 100 comprises an instruction cache 104 and an advance read control section 102.

The instruction cache 104 comprises a data array 112 for storing data, and a tag 114 showing to which block the stored data belongs.

The advance read control section 102 comprises an address register 44, a counter 46, and a selector 48 same as in the first preferred embodiment. However, the output of the counter 46 is given also to the tag 114 in this preferred embodiment. The advance read control section 102 also comprises an instruction register 40 and an instruction analysis section 110. The instruction analysis section 110 is connected to the instruction cache 104, instruction register 40, and selector 48, and judges whether the instruction contained in the read block stored in the instruction register 40 is a branch predict instruction or not, and, in the case of branch predict instruction, whether its branch destination is within the read block being read out in the instruction register 40 or next block, or forward branch or not.

The instruction analysis section 110 controls the selector 48, memory 22 and instruction cache 104 depending on the result of judgement, and transfers, if necessary, the next block from the memory 22 into the instruction cache 104.

In the instruction analysis section 110, an error signal 116 is given from the tag 114 of the instruction cache 104. The error signal 116 is a signal, in the case of this preferred embodiment, that is generated when the block corresponding to the address outputted by the counter 46 is not present in the instruction cache 104. An error signal is also outputted when the block of access request from the CPU is not present in the instruction cache 104.

Figure 6:
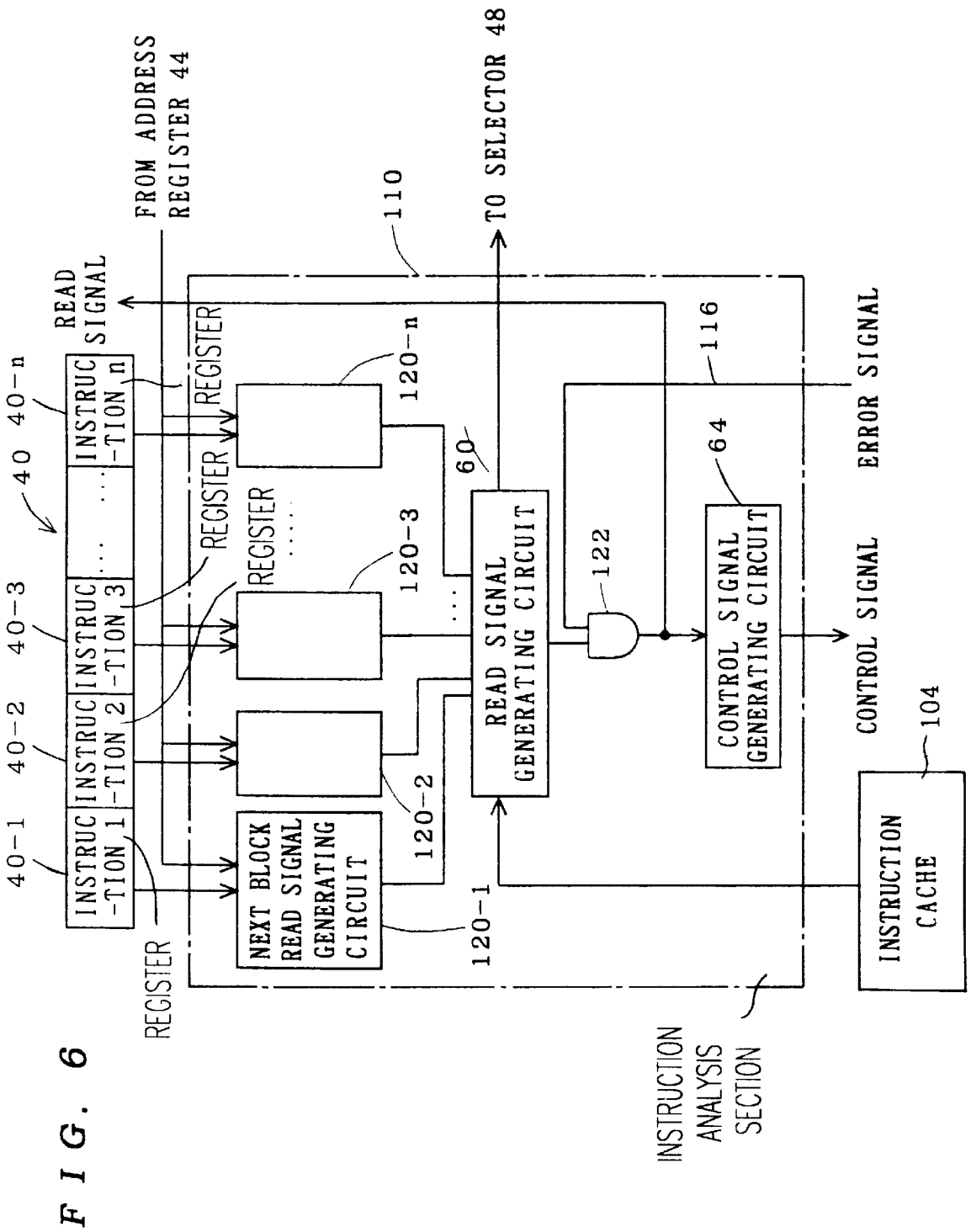
FIG. 6 is a block diagram showing an internal structure of an instruction analysis section in the second preferred embodiment.

Referring now to FIG. 6, the instruction analysis section 110 comprises n next block read signal generating circuits 120-1 to 120-n provided corresponding to registers 40-1 to 40-n storing instruction 1 to instruction n, a read signal generating circuit 60 for generating a selection signal to the selector 48 and a read signal to be given to the memory 22 (FIG. 5), in response to the outputs of the next block read signal generating circuits 120-1 to 120-n and the read signal from the instruction cache 104, an AND gate 122 provided with the output of the read signal generating circuit 60 and error signal 116 from the instruction cache 104, and a control signal generating circuit 64 for generating a control signal to be given to the instruction cache 104 in response to the output of the AND gate 122.

The read signal generating circuit 60 is same as that of the first preferred embodiment shown in FIG. 2 and FIG. 4. Its detail is, therefore, not repeated herein.

Figure 7:
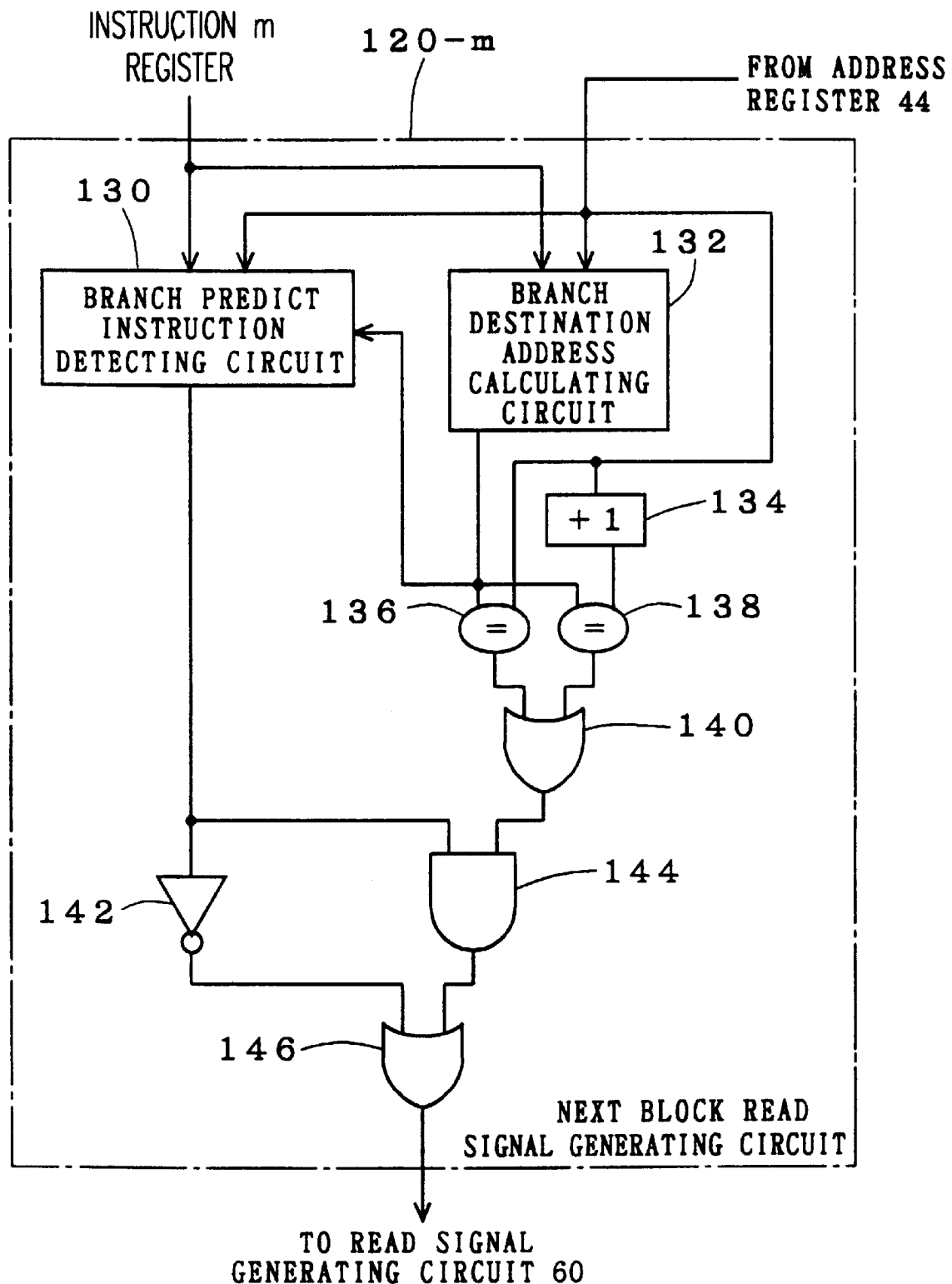
FIG. 7 is a block diagram showing an internal structure of a next block read signal generating circuit.

Making reference to FIG. 7, a next block read signal generating circuit 120-m comprises a branch predict instruction detecting circuit 130 for detecting if the instruction m is a branch predict instruction or not, a branch destination address calculating circuit 132 for calculating the branch destination address on the basis of the address from the address register 44 and the content of the instruction m, an adder 134 for adding the portion of one block to the address stored in the address register 44, a coincidence detecting circuit 136 for judging if the address of the read block stored in the address register 44 and the block of the address calculated in the branch destination address calculating circuit 132 coincide with each other or not, a coincidence detecting circuit 138 for judging if the address outputted by the adder 134 and the output of the branch destination address calculating circuit 132 coincide with each other or not, an OR gate 140 having two inputs connected to the outputs of the coincidence detecting circuits 136 and 138, an AND gate 144 having two inputs connected to the output of the branch predict instruction detecting circuit 130 and output of the OR gate 140, a NOT circuit 142 for inverting the branch signal outputted by the branch predict instruction detecting circuit 130, and an OR gate 146 having two inputs connected to the output of the NOT circuit 142 and the output of the AND gate 144.

Figure 8:
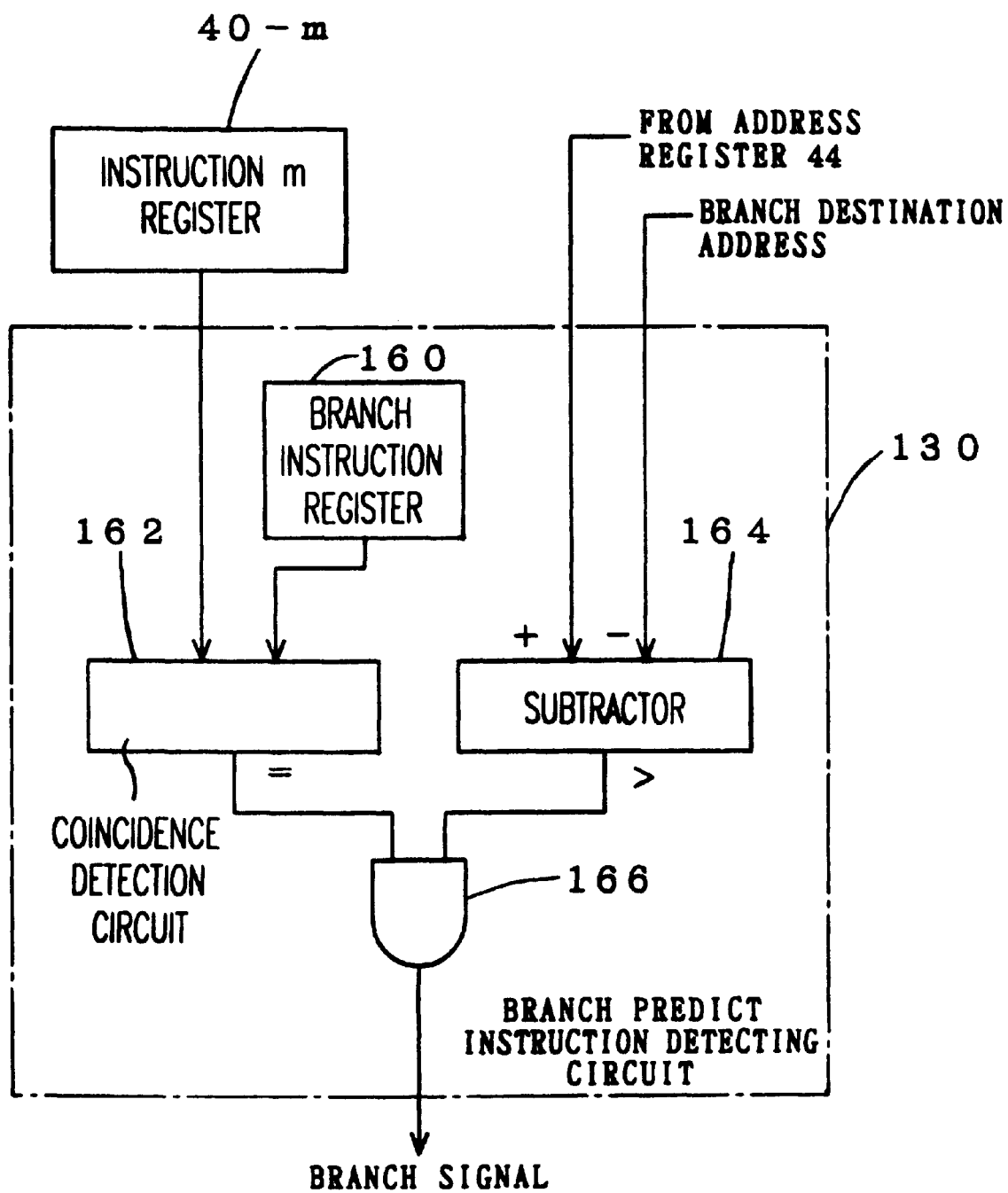
FIG. 8 is a block diagram showing an internal structure of a branch predict instruction detecting circuit.

Referring to FIG. 8, the branch predict instruction detecting circuit 130 comprises a register 160 for storing a branch instruction, a coincidence detecting circuit 162 for judging if the instruction m given from the register 40-m coincides with the branch instruction stored in the branch instruction register 160 or not, a subtractor 164 for subtracting the branch destination address outputted by the branch destination address calculating circuit 132 from the address stored in the address register 44, and an AND gate 166 having two inputs connected to the output of the coincidence detecting circuit 162 and output of the subtractor 164. In the case of this preferred embodiment, it is determined, for example, preliminarily that the instruction is a branch instruction if its first bit and second bit are "1", and the instruction set is specified accordingly. In this case, therefore, comparison by the coincidence detecting circuit 162 is done only on the bits showing whether the instruction is a branch instruction or not, such as first bit and second bit.

Referring to FIG. 5 to FIG. 8, the second preferred embodiment operates as follows. The instruction cache 104 feeds a request signal to the instruction analysis section 110 when the data requested from the CPU is not included in the data array 112. At the same time, an error signal 116 is also given to the instruction analysis section 110.

In FIG. 6, the read signal generating circuit 60 generates a read signal in response to the given read signal, and the AND gate 122 feeds this read signal to the memory 22. At this time, the selection signal generated by the read signal generating circuit 60 is a value for selecting the address from the instruction cache 104 by the selector 48. Therefore, the address outputted from the instruction cache 104 is stored in the address register 44.

The memory 22, in response to the read signal given from the instruction analysis section 110, gives a one-block portion of the data of the address indicated by the address register 44 to the instruction register 40. The instruction analysis section 110 stores the content of the instruction register 40 in the instruction cache 104 by the control signal generating circuit 64 shown in FIG. 6.

The next block read signal generating circuits 120-1 to 120-n shown in FIG. 6 operate individually as follows.

The branch destination address calculating circuit 132 shown in FIG. 7 calculates the branch destination address of the instruction m on the basis of the address stored in the address register 44 when the instruction m is a branch instruction, and generates the address of the branch destination block in which the data of the branch destination address is stored. This address is given to the branch predict instruction detecting circuit 130 and coincidence detecting circuit 136 and 138.

Referring to FIG. 8, the coincidence detecting circuit 162 judges if the specified bit of the instruction m stored in the register 40-m coincides with the specified bit of the branch instruction stored in the branch instruction register 160 or not, and if coinciding, a coincidence signal is applied to the AND gate 66.

The subtractor 164 subtracts the branch destination address given from the branch destination address calculating circuit 132 from the address stored in the address register 44, and when the result is positive, a signal showing a backward branch is given to the AND gate 166. The output of the AND gate 166 is a branch signal, and it is outputted only when the instruction m is a branch instruction and is a backward branch.

In FIG. 7, the coincidence detecting circuits 136 and 138 judge if the branch destination address coincides with the address of the block stored in the address register 44 or the address of next block or not, and if coinciding, each coincidence signal is given to the OR gate 140. Therefore, the output of the OR gate 140 is at H level when the branch destination address is within read block or within next block.

As mentioned already, the branch signal outputted by the branch predict instruction detecting circuit 130 (see FIG. 8) is at H level only when the instruction m is a branch instruction and is a backward branch. Therefore, the output of the AND gate 144 becomes H level when the instruction m is a backward branch instruction and the branch destination address is immediately before the read block or next block. The output of the AND gate 144 is given to the OR gate 146.

The output of the NOT circuit 142 becomes H level when the instruction m is not a branch instruction or is a forward branch if it is a branch instruction. Therefore, the output of the OR gate 146 becomes L level only when the instruction m is a branch instruction and is a backward branch, and the branch destination address is out of the read block or next block. In this case, the next block is not read out.

Referring back to FIG. 6, when the instruction is predicted to be other than a backward branch instruction, the read signal generating circuit 60 generates a selection signal same as in the first preferred embodiment, and gives to the selector 48, and also generates a read signal to give to the AND gate 122. The signal showing the address of next block is given from the counter 46 to the tag 144 of the instruction cache 104. The tag 144 of the instruction cache 104 judges if the read block is already stored in the data array 112 or not, and if not present, an error signal 116 is sent again to the AND gate 122. In this case, a read signal is given to the memory 22 through the AND gate 122, and a control signal is further generated in the control signal generating circuit 64, and is given to the instruction cache 104. When the next block is already stored in the instruction cache, error signal 116 is not given. Therefore, read signal is not generated, and transfer of next block is not done. It hence prevents wasteful operation of transferring the block already stored in the instruction cache from the memory. Incidentally, without installing AND gate 122, by reading out regardless of the error signal, the advance read itself can be done similarly.

Thus, according to the second preferred embodiment, if the instruction is a branch predict instruction, a control signal for transferring the next block from the memory into the cache is generated when the branch destination is a read block of access request or its next block. Therefore, even in the branch predict instruction, depending on the branch destination address, advance read of block can be done, and the probability of cache error can be lowered. If the instruction is a branch instruction and is a forward branch, similarly, a control signal for reading out the next block is generated. In this way, the branch instruction of backward branch can be handled as branch predict instruction, and wasteful transfer of block can be decreased.

<Third preferred embodiment> in a third preferred embodiment, as the instruction, an instruction for loading the next block from the memory into the cache is preliminarily prepared. In this preferred embodiment, only the instruction analysis section is shown in a block diagram. The constitution of other parts is same as in the first and second preferred embodiments. A next block load instruction for indicating to read the content of the next block from the memory is specified in advance, and the next block load instruction is inserted into the instruction as required, so that the next block can be transferred into the instruction cache when there is a next block load instruction in the block being read out. Therefore, by effectively disposing the next block load instruction in the instruction, cache errors can be prevented.

Figure 9:
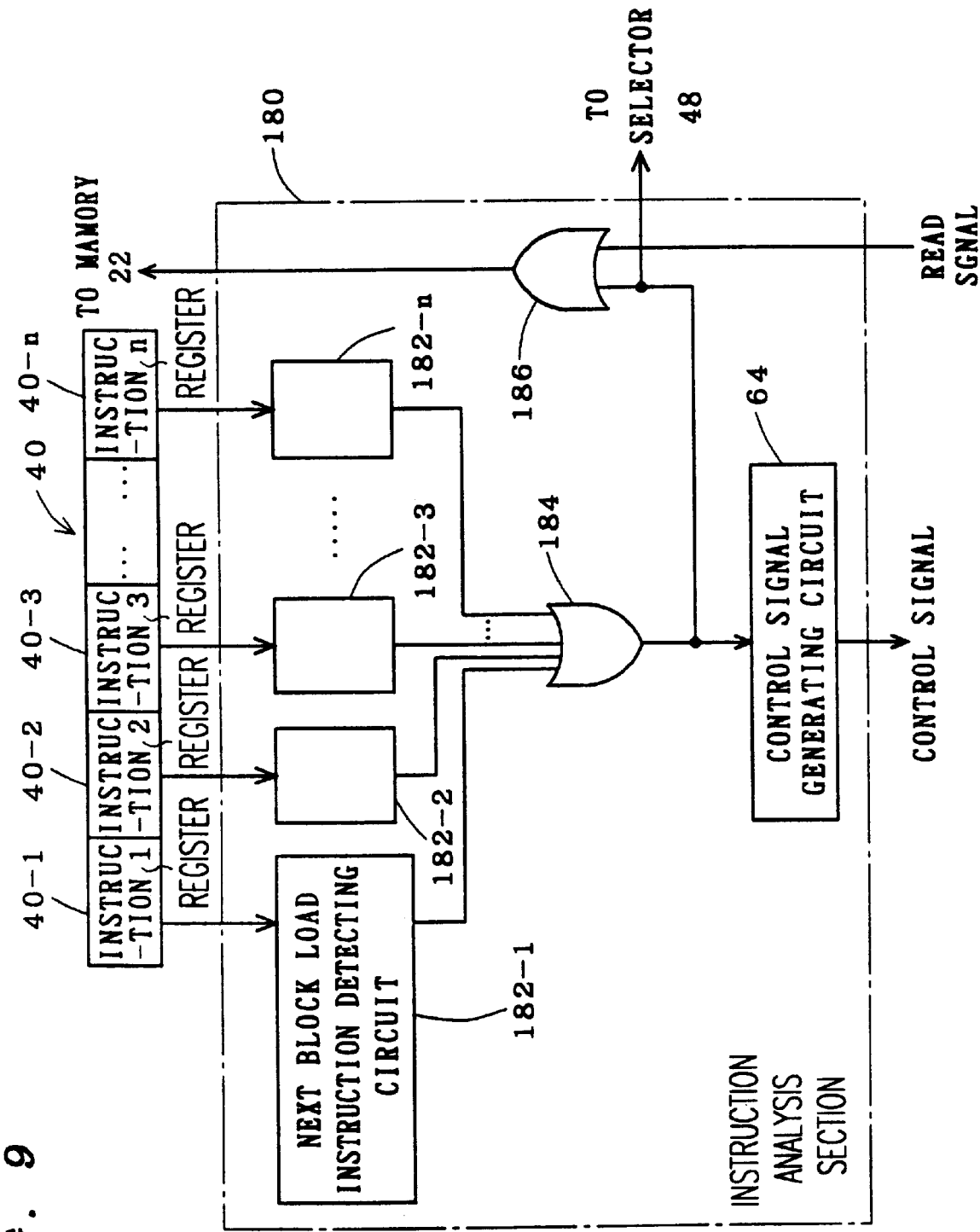
FIG. 9 is a block diagram showing a constitution of an instruction cache memory with advance read function in a third preferred embodiment of the invention.

FIG. 9 is a block diagram showing the constitution around the instruction analysis section of the instruction cache memory with advance read function of the third preferred embodiment of the invention. As shown in the diagram, an instruction analysis section 180 of the instruction cache with advance read function of the third preferred embodiment comprises n branch predict instruction detecting circuits 182-1 to 182-n provided corresponding to instruction 1 to instruction n, an OR gate 184 having n inputs connected to the outputs of the branch predict instruction detecting circuits 182-1 to 182-n, a control signal generating circuit 64 for generating a control signal for controlling the instruction cache, being connected to the output of the OR gate 184, and an OR gate 186 having two inputs to receive the output of the OR gate 184 and read signal from the instruction cache. The output of the OR gate 186 is a read signal to the memory 22. The output of the OR gate 184 is a selection signal to the selector 48.

Figure 10:
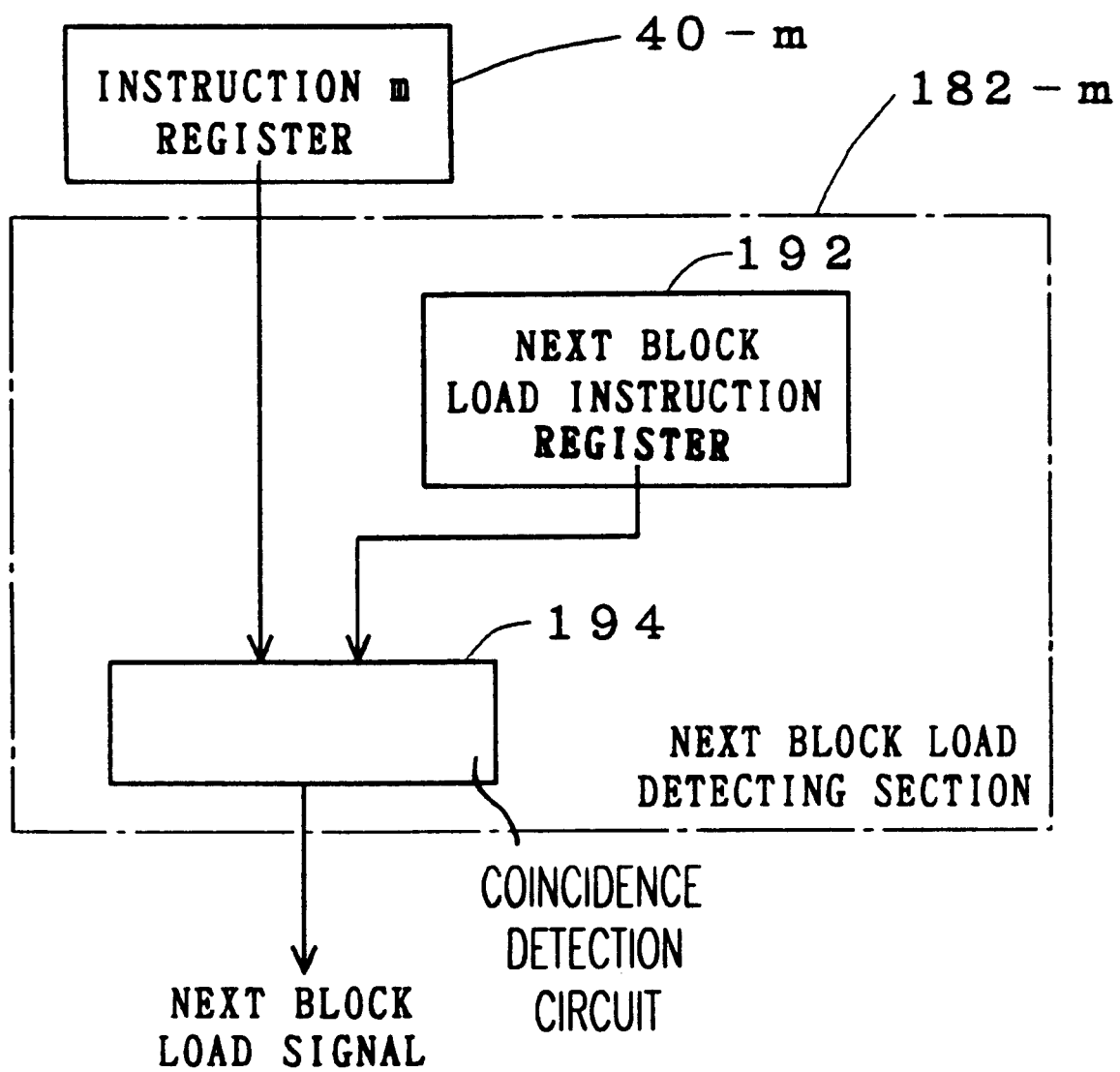
FIG. 10 is a block diagram of a next block load instruction detecting section of the third preferred embodiment.

Referring to FIG. 10, the next block load instruction detecting circuit 182-m comprises a register 192 storing a next block load instruction, and a coincidence detecting circuit 194 for generating a next block load signal when coinciding by detecting if the instruction m coincides with the next block load instruction or not.

Referring then to FIG. 9 and FIG. 10, the instruction analysis section of the instruction cache with advance read function of the third preferred embodiment operates as follows.

When a read request occurs from the instruction cache, the read signal is given to the memory 22 through the OR gate 186, and the instruction for the portion of one block is transferred from the memory 22 to the instruction register 40, and further transferred to the instruction cache.

In FIG. 10, in each one of the next block load instruction detecting circuits 182-1 to 182-n, the coincidence detection circuit 194 judges if the instruction m coincides with the next block load instruction or not, and a next block load signal is generated when coinciding, and given to the OR gate 184 shown in FIG. 9.

The OR gate 184 gives a read signal to the memory 22 through the OR gate 186 when even one next block load signal is detected. Similarly, the output of the OR gate 184 is a selection signal to the selector 48. The selector 48 selects the block of the next address of the read block first given from the instruction cache same as in the first and second preferred embodiments, and gives it to the address register 44 (see FIG. 1), so that the next block is transferred to the instruction cache.

When no next block load instruction is detected, the read signal is not generated from the OR gate 184, and hence next block is not transferred.

Incidentally, the control signal generating circuit 64 is designed to generate a control signal for controlling the storing timing of the first block and next block into the instruction cache, and apply to the instruction cache.

According to the third preferred embodiment, thus, it is not necessary to judge if the instruction contained in the block being read out is branch predict instruction or not, and a signal for transferring the next block from the memory to the cache at high speed is generated. In the case of a machine capable of operating parallel, the instructions that can be executed parallel are limited. Hence, in many cycles, there are units that are not used in the machine. An instruction for utilizing the units and transferring the next block from the memory into the cache can be executed. By thus constituting, it is not necessary to if the instruction is a branch predict instruction or not, and a signal for transferring the next block from the memory to the cache at high speed can be generated, and moreover by disposing the next block load instruction at a proper place preliminarily, the probability of occurrence of cache error can be lowered.

<Fourth preferred embodiment>

Figure 11:
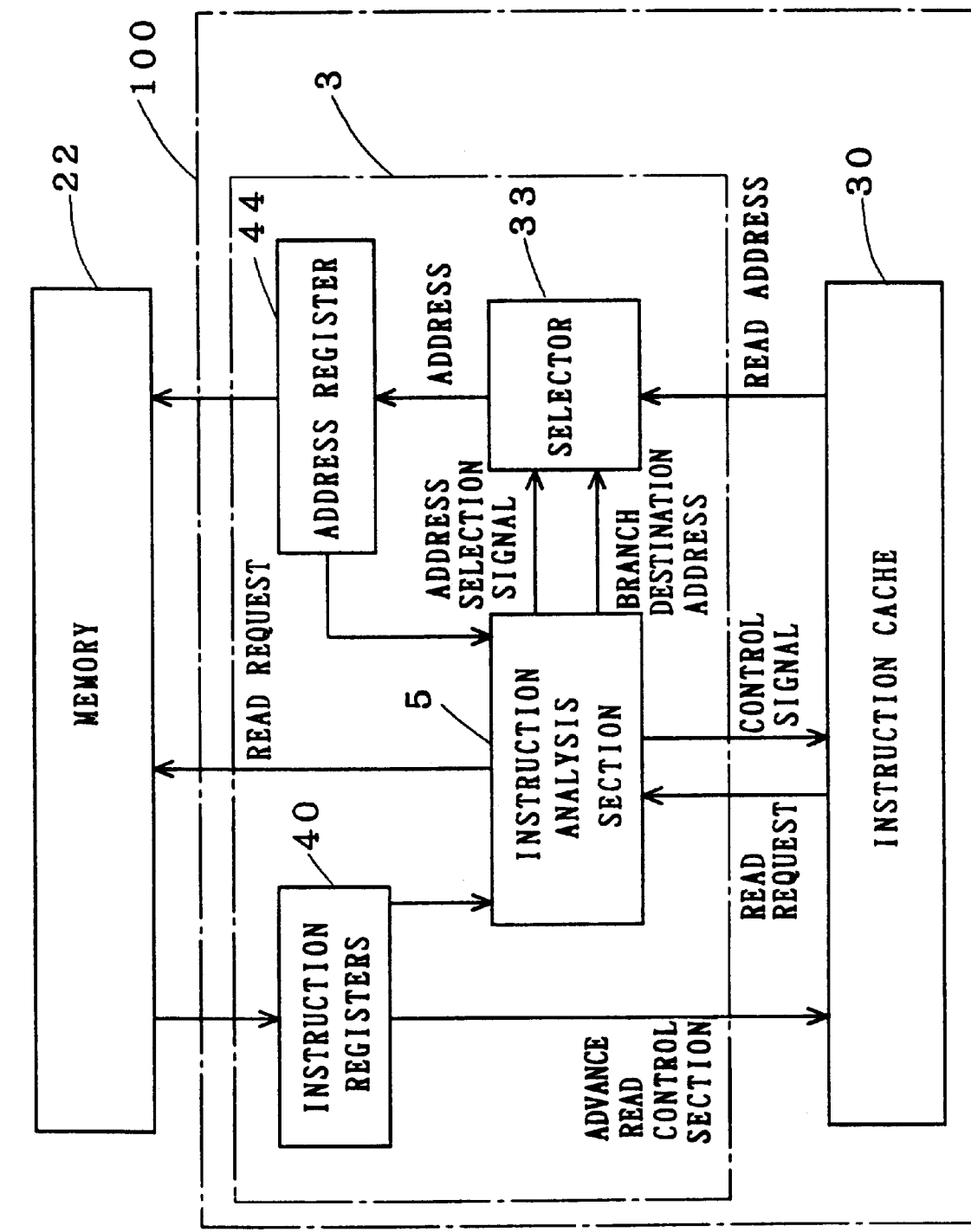
FIG. 11 is a block diagram showing a constitution of an instruction cache memory with advance read function in a fourth preferred embodiment of the invention.

FIG. 11 is a block diagram showing a constitution of an instruction cache memory with advance read function in a fourth preferred embodiment of the invention. In the diagram, the memory 22 is a memory device for composing the lower portion of the memory layers, and the instruction cache 30 is a memory device for composing the upper portion, and, in particular, provided for storing only instructions, and buffering the difference between the execution speed of the instruction by the CPU and the reading speed from the memory device 22.

The instruction cache 30, when the data of the block indicted by access request of the CPU is not found in the instruction cache 30, sends a read request as control signal, and read address showing the block to be read out to the read control section 3. Besides, the instruction cache 30, when the data of the block indicated by the access request of the CPU is present in the instruction cache 30, sends the data of the block to the data bus to which the CPU is connected, without outputting read request and read address.

The read control section 3 comprises an address register 44 for storing the address of the block including the instruction to be read out from the memory 22, a selector 33 for selecting the output of the branch destination address given from the instruction cache 30 or instruction analysis section 5 and sending into the address register 44 in response to a given selection signal, an instruction register 40 for once storing the instruction of one block being read out from the address specified by the value stored in the address register 55, and applying to the instruction cache, and an instruction analysis section 5 for detecting if a branch instruction is included or not in one block stored in the instruction register 40, calculating the branch destination address if contained, controlling the selector 33, memory 22 and instruction cache 30, and transferring the block containing the necessary instruction from the memory 22 into the instruction cache 30. Of the read control section 3, the other portions than the instruction analysis section 5 correspond to the branch destination block reading means.

Explained below is the operation when data not found in the instruction cache is requested from the CPU, and block reading occurs from the memory in the instruction cache.

1. The instruction cache 30 transmits the read address of request instruction to the memory 22 through the selector 33 and address register 44, and also transmits the read request to the memory 22 through the analysis instruction section 5.

2. The read block being read out from the memory 22 is stored in the instruction register 40, and is transferred to the instruction cache 30. The instruction analysis section 5 analyzes presence or absence of branch instruction among the instructions stored in the memory register 40, and, when a branch instruction is found, calculates the branch destination address by referring to the value of the address register 44 depending on the instruction (such as PC relative instruction). The instruction analysis section 5 sends a control signal to show whether or not to transfer the block (branch destination block) of the branch destination address from the memory 22 to the instruction cache 30 to the instruction cache 30, and outputs a read signal for controlling reading to the memory 22, and sends an address selection signal to select which address should be stored in the address register 55 to the selector 33.

3. The memory 22, according to the read signal given from the instruction analysis section 5, transfers the block of the address stored in the address register 55 to the instruction cache 30 through the instruction register 40.

4. Thereafter the steps 1 to 3 are repeated until read request is outputted from the instruction cache 30 or branch instructions are not longer present in the block stored in the instruction register 40.

In the instruction cache, when a branch instruction is included in the read block fetched by the read signal, the branch destination block including the instruction of branch destination is often present in the cache. Therefore, as in the instruction cache memory with advance read function in the fourth preferred embodiment, by preliminarily transferring the branch destination block from the memory into the instruction cache, possibility of occurrence of cache error is lowered, so that the system performance may be enhanced.

[Instruction analysis section]

Figure 12:
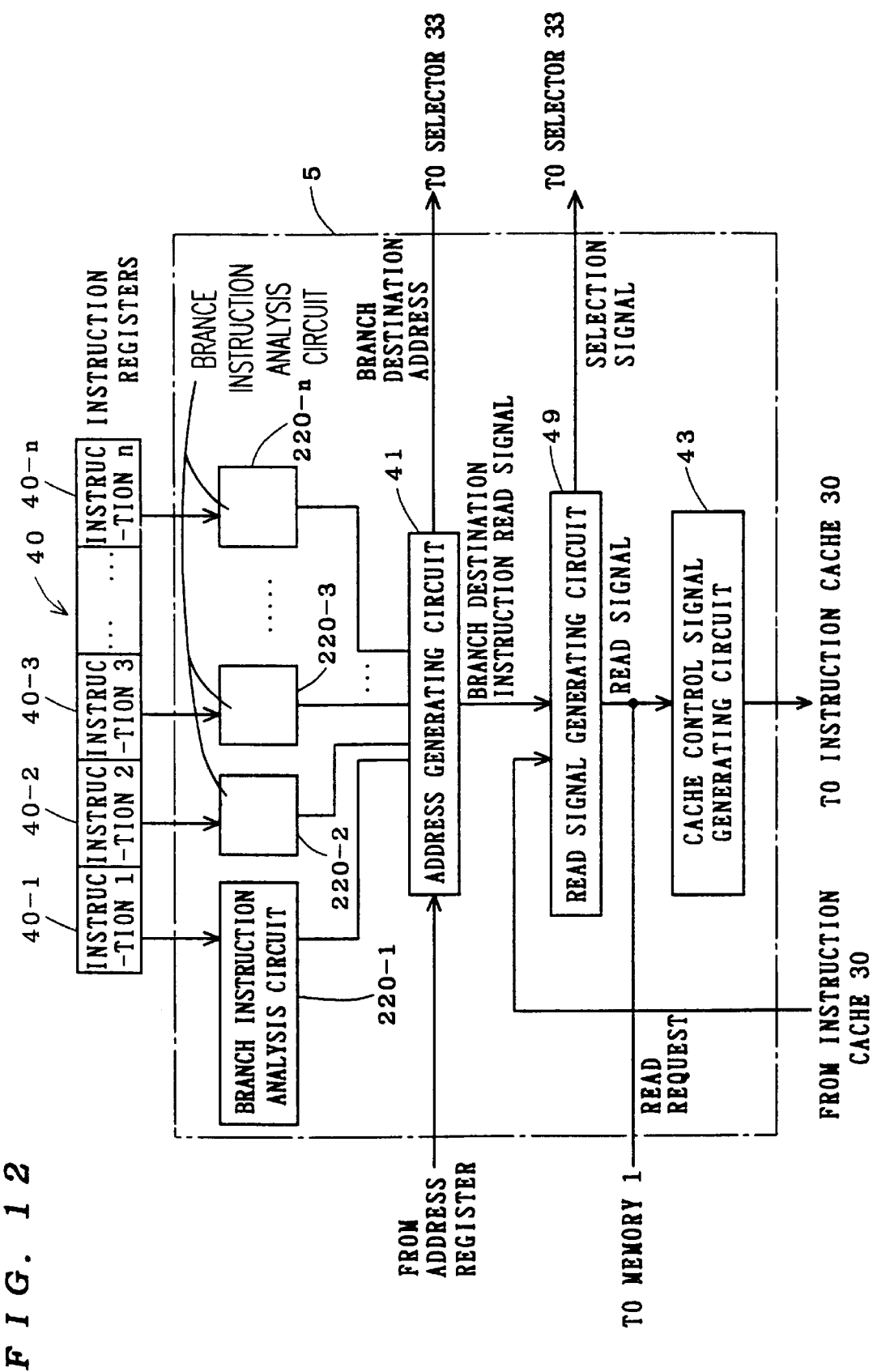
FIG. 12 is a block diagram showing an internal structure of an instruction analysis section of the fourth preferred embodiment.

FIG. 12 is a block diagram showing an internal structure of the instruction analysis section 5.

Generally, branch instructions include absolute address branch, PC (program counter) relative branch, and register indirect branch. The branch instructions handled in the invention are absolute address branch and PC relative branch. An instruction code of absolute address branch is composed of an operation code showing an absolute address branch, and a branch destination address. An instruction code of PC relative branch is composed of an operation code showing the PC relative branch, and offset which is an address difference between the branch instruction and instruction of branch destination.

The instruction register 40 is composed of registers 40-1 to 40-n for storing n instructions 1 to n. The instruction analysis section 5 comprises branch instruction analysis circuits 220-1 to 220-n connected respectively to the registers 40-1 to 40-n for detecting whether branch instruction is included or not, determining the type of the branch instruction if included, and detecting the branch destination address or offset, an address generating circuit 41 for calculating the branch destination address by making use of the output of the address register 44 and the branch information obtained from the branch instruction analysis circuit 220-1 to 220-n in response to the outputs of the branch instruction analysis circuits 220-1 to 220-n, and generating a branch destination instruction read signal, a read signal generating circuit 49 for outputting a selection signal to the selector 33 and a read signal to the memory 22 in response to the output of the address generating circuit 41 and read request from the instruction cache 30, and a cache control signal generating circuit 43 for generating a control signal to the instruction cache 30 in response to the output of the read signal generating circuit 49. The branch instruction analysis circuits 220-1 to 220-n shown in FIG. 12 are identical in structure. Hereinafter, m refers to an arbitrary integer of 1 to n.

Their operation is described in the first place. In basic operation, in the instruction analysis section 5, the content of the read block stored in the instruction register 50 is analyzed to judge if there is branch instruction or not, and if there is branch instruction, a branch destination address is calculated, and a control signal for transferring the block including that instruction from the memory 22 to the instruction cache 30 is generated.

1. The branch instruction analysis circuit 220-m analyzes the instruction stored in the instruction register 40-m, detects whether branch instruction or not, and, in the case of branch instruction, judges the branch instruction be PC relative branch, absolute address branch, or other, and transfers the type of the branch instruction, and offset, in the case of PC relative instruction, as branch destination information or branch address, in the case of absolute address branch, as branch destination information, to the address generating circuit 41. At this time, in the case of other branch than PC relative branch or absolute address branch, the branch destination address cannot be calculated, and hence it is handled same as others than branch instruction.

2. The address generating circuit 41 calculates the branch destination address by making use of the branch destination information given from the branch instruction analysis circuits 220-1 to 220-n and output of the address register 44. In the case of the PC relative branch, the branch destination address is the address + off set of the branch instruction, and in the case of absolute address branch, it is the address obtained by the branch destination information. Besides, by making use of the outputs of the branch instruction analysis circuits 220-1 to 220-n, when branch instruction (PC branch, absolute address branch) is included, a branch destination instruction read signal for reading out the branch destination block including the instruction of the branch destination from the memory 22 is generated. In the case of other instructions than branch instruction only, branch destination read signal is not generated.

3. The read signal generating circuit 49 outputs a read request to the memory 22 on the basis of the read request from the instruction cache 30 and the branch destination instruction read signal which is the output of the address generating circuit 41. If there is read request from the instruction cache 30, the address given from the instruction cache 30 is selected, and when the branch destination instruction read signal is generated, a selection signal indicating selection of branch destination address which is the output of the address generating circuit 41 is transmitted to the selector 33. However, the read request from the instruction cache 30 is given priority over the branch destination instruction read signal from the address generating circuit 41.

4. The cache control signal generating circuit 43 receives a read signal from the read signal generating circuit 49, and sends a control signal for controlling the instruction cache 30 to the instruction cache 30.

Figure 13:
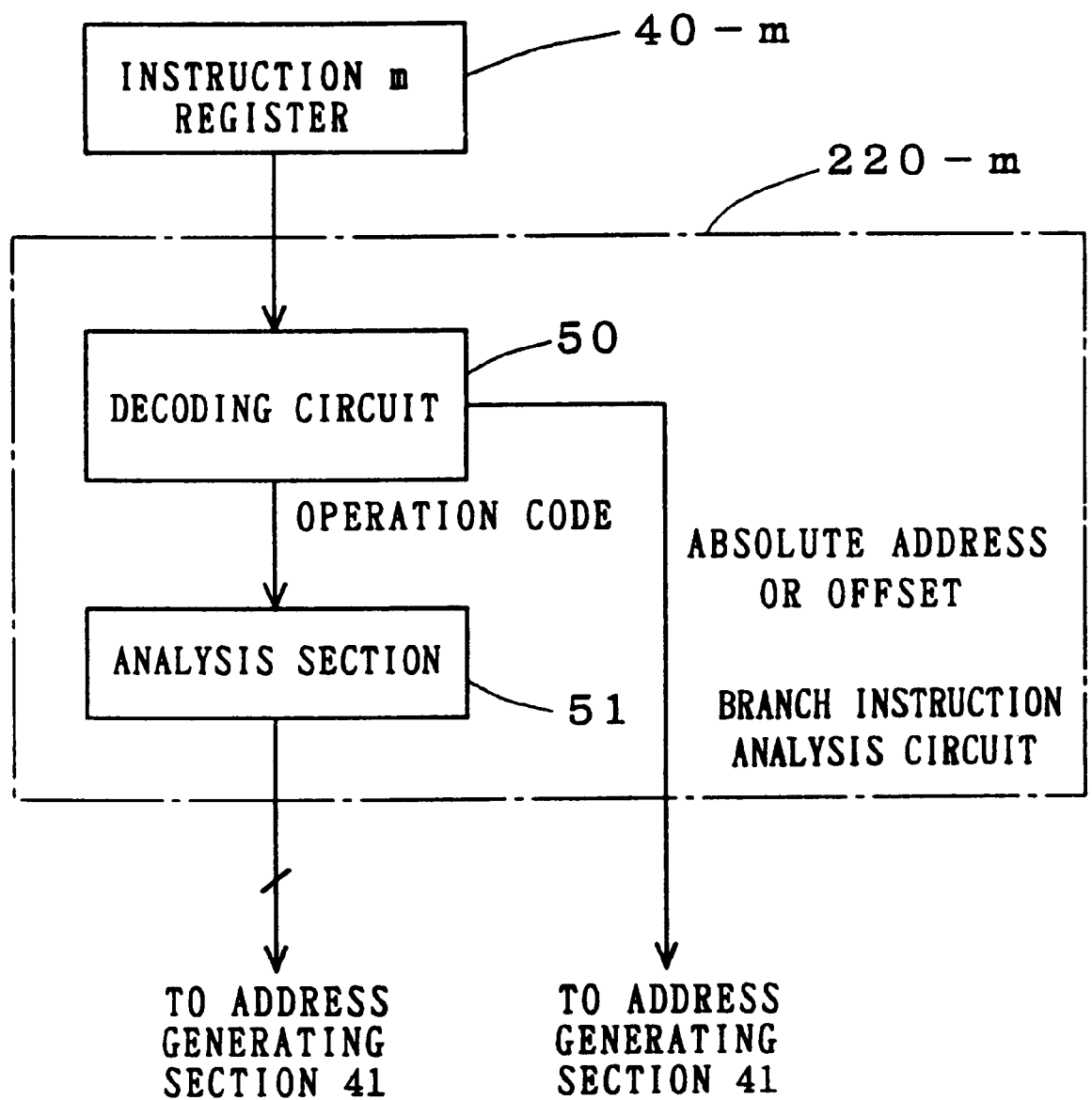
FIG. 13 is a block diagram showing an internal structure of a branch instruction analysis circuit of the fourth preferred embodiment.
Figure 14:
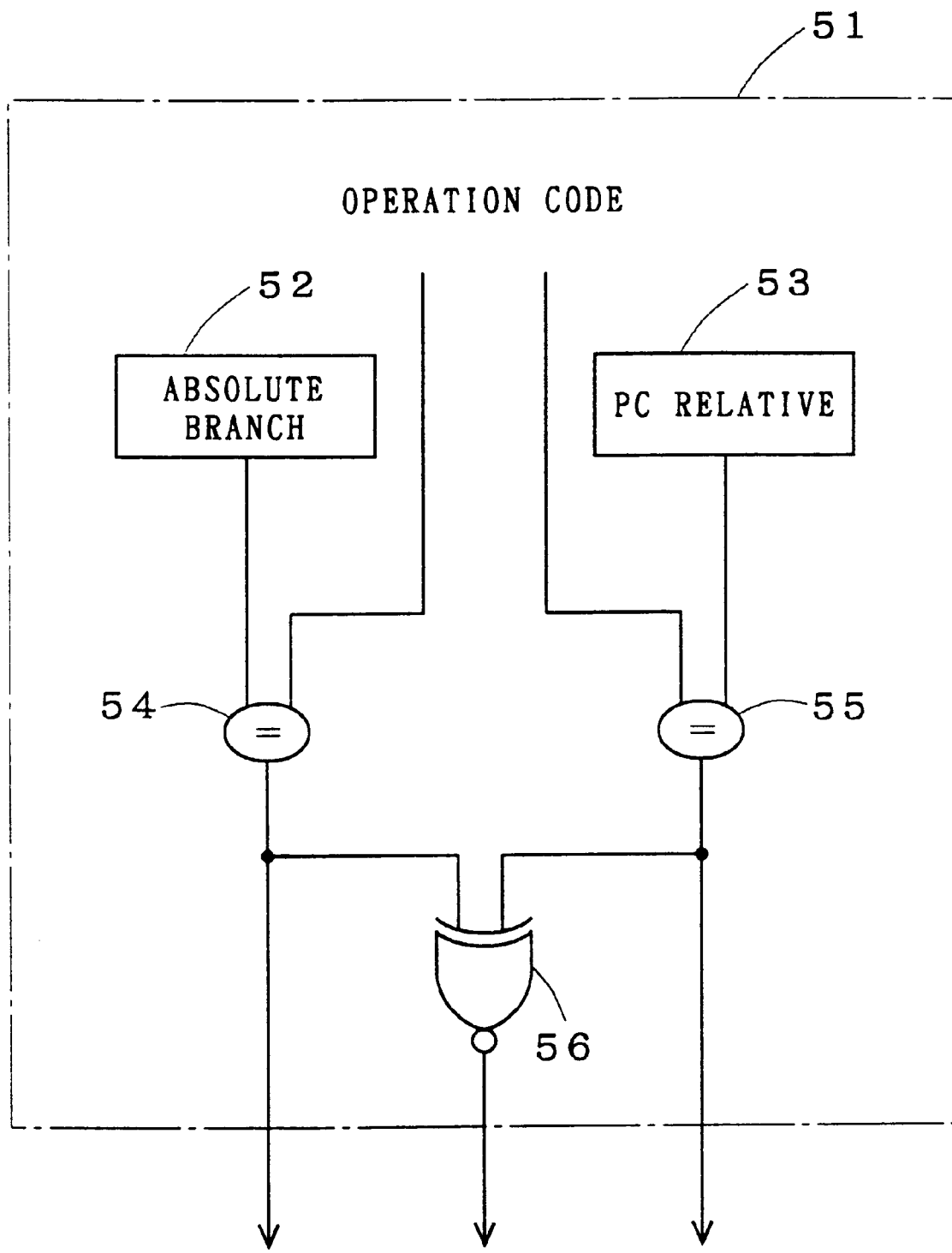
FIG. 14 is a block diagram showing an internal structure of an analysis section of the fourth preferred embodiment.

FIG. 13 is a block diagram showing an internal structure of branch instruction analysis circuit 220, and FIG. 14 is a block diagram showing an internal structure of an analysis section 51.

The constitution of the branch instruction analysis circuit 220-m is explained by reference to FIG. 13. As shown in FIG. 13, the branch instruction analysis circuit 220-m comprises a decoding circuit 50 for decoding the instruction stored in the instruction register 40-m, and generating an absolute address and offset for calculating the operation code and branch destination address, and an analysis section 51 for receiving the operation code and analyzing it whether absolute branch, PC branch or other.

The analysis section 51 comprises, as shown in FIG. 14, a memory unit 52 for storing the operation code of the absolute branch instruction, a memory unit 53 for storing the operation code of the PC relative branch instruction, a comparator 54 for receiving operation codes outputted from the memory unit 52 and decoding circuit 50, a comparator 55 for receiving the output of the memory unit 53 and operation code, and an XNOR gate 56 for receiving the output result of the comparator 54 and output result of comparator 55, and outputting "0" when either the output of the comparator 54 or the output of the comparator 55 is "1". The symbol for expressing the type is three bits including the outputs of the comparators 54, 55 and XNOR gate 56, and the type of the instruction is indicated by the output of the comparator 54 as the first bit, the output of the comparator 55 as the second bit, and the output of the XNOR gate 56 as the third bit. That is, when the value of the signal is "1", it means absolute branch, and in the case of "2", it means PC relative branch, and "4" means it is not branch instruction.

These operations are described below.

1. The decoding circuit 50 decodes the instruction of instruction register 40-m, and generates an absolute address or an offset for calculating the operation code or branch destination address. This decoding circuit 50 is enough in a simplified form as far as having functions for detecting the branch instruction from the decoding circuit in the CPU and detecting the absolute address or offset.

2. In the analysis section 51, the operation code obtained from the decoding circuit 50, and the operation code of the absolute branch instruction stored in the memory unit 52 are compared by the comparator 54. Besides, the operation code obtained from the decoding circuit 50, and the operation code of relative branch instruction stored in the memory unit 53 are compared by the comparator 55. When the branch instruction is absolute branch, the output of the comparator 54 is "1", and in the case of PC relative branch, the output of the comparator 55 is "1", and otherwise the output of the XNOR gate 56 is "1". These signals are sent into the address generating circuit 41 as the signal expressing the type of the instruction.

Figure 15:
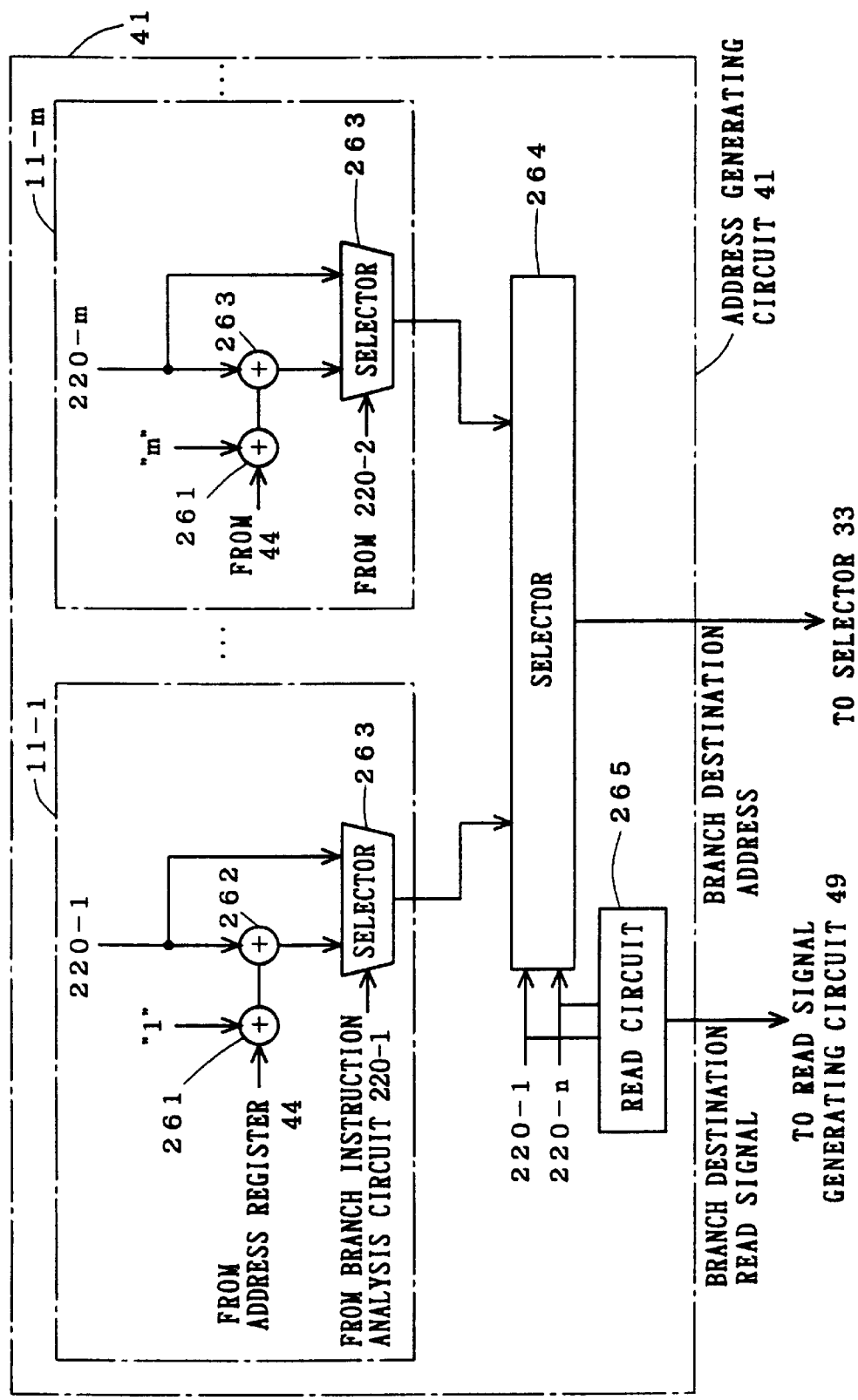
FIG. 15 is a block diagram showing an internal structure of an address generating circuit of the fourth preferred embodiment.

FIG. 15 is a block diagram showing an internal structure of the address generating circuit 41. As shown in the diagram, the address generating circuit 41 comprises branch destination address generating circuits 11-1 to 11-n for generating addresses of branch destinations according to the outputs from the address register 44 and branch instruction analysis circuits 220-1 to 220-n, a selector 264 for selecting one of the branch destination addresses obtained from the branch destination address generating circuits 11-1 to 11-n according to the output of the branch instruction analysis circuits 220-1 to 220-n, and a read circuit 265 for generating a read signal according to the outputs of the branch instruction analysis circuits 220-1 to 220-n. The branch destination address generating circuit 11-m is composed of an adder 261 for adding the value of the address register 44 and m, an adder 262 for adding the output result of the adder 261 and the offset, and a selector 263 for selecting either the output result of the adder 262 or the absolute address according to the signal indicating the type of the instruction obtained from the branch instruction analysis circuit 220-m.

The operation of the address generating circuit 41 is described below.

1. When the instruction stored in the instruction register 40-m is a branch instruction, the branch destination address is calculated in the branch destination address generating circuit 11-m. The adder 261 adds the address of the read block in the instruction register stored in the address register 44, and the number m of the register in which the instruction is stored. This is for knowing the address of the branch instruction. The adder 262 adds the output of the adder 261 and the offset value obtained from the branch instruction analysis circuit 220-m, and calculates the branch destination address. The selector 263 selects the output of the adder 262 when the instruction is PC branch, or the absolute address which is the output of the branch instruction analysis circuit 220-m in the case of absolute address branch.

2. The selector 264 selects the branch destination address according to the signal expressing the type of the instruction of the branch instruction analysis circuit 220-1 to 220-n, among the outputs of the branch destination address generating circuits 11-1 to 11-n. For example, when the instruction k is a branch instruction, the signal expressing the type of the branch instruction of 40-k is "1" or "2". The selector 264, according to this signal, selects the output result of the branch destination address generating circuit 11-k as the branch destination address.

3. The read circuit 265 generates a branch destination read signal showing it is necessary to read the instruction at the branch destination when there is at least one signal showing branch instruction among the signals of the types of instructions in the outputs of the branch instruction analysis circuits 220-1 to 220-n.

Figure 16:
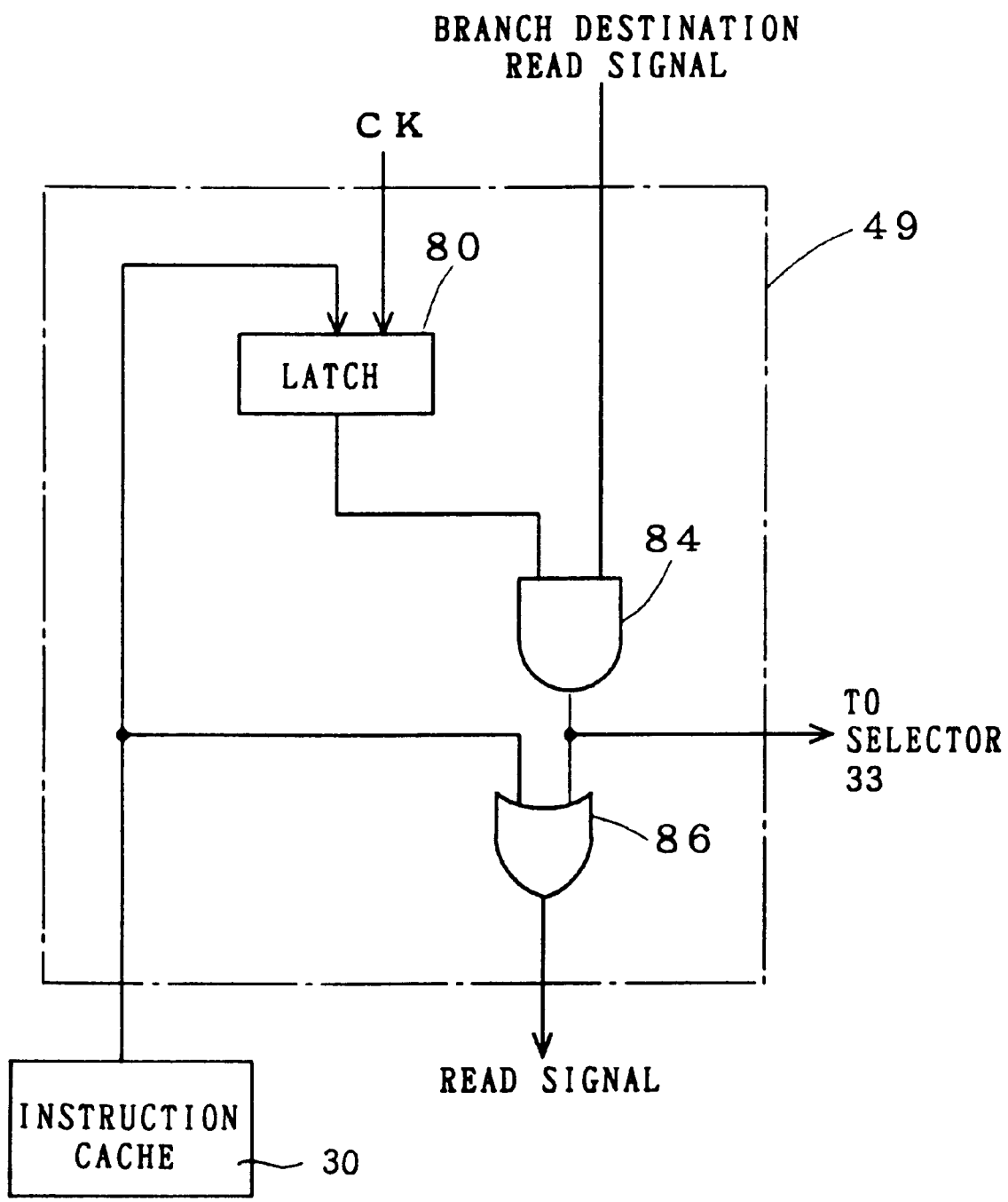
FIG. 16 is a block diagram showing an internal structure of a read signal generating circuit of the fourth preferred embodiment.

FIG. 16 is a block diagram showing an internal structure of the read signal generating circuit 49. As shown in the diagram, the read signal generating circuit 49 comprises a latch 80 for one latching the read request given from the instruction cache 30, an AND gate 84 connected to the branch destination read signal outputted from the address generating circuit 41 and the output of the latch 80, and an OR gate 86 receiving the output of the AND gate 84 and the read request from the instruction cache 30. The output from the AND gate 84 is the selection signal to the selector 33, and the output of the OR gate 86 is the read signal to the memory 22. The latch 80 further receives the clock CK for operation of the CPU 18, and stores the read request obtained from the instruction cache 30 in synchronism with the clock CK.

The operation of the read signal generating circuit 49 is described below.

1. The latch 80 once latches the read request from the instruction cache 30, and gives to the AND gate 84. Therefore, the AND gate 84 gives the branch destination read signal obtained from the address generating circuit 41 to the selector 33 and OR gate 86, one clock later than the read request initially given from the instruction cache 30 to the memory 22. When the branch destination read signal of the address generating circuit 41 is true, the read signal is outputted from the AND gate 85, and the selector 33 selects the branch destination address.

2. The OR gate 86 calculates the OR of the read request from the instruction cache 30 and the output of the AND gate 84, and gives to the memory 22 as read signal. Therefore, the memory 22 first gives the block requested to read from the instruction cache 30 to the instruction register 40, and the instruction cache 30 stores the output of the instruction register 40. When there is a branch instruction in the instruction stored in the instruction register 40, the memory 22 gives the branch destination block to the instruction register 40, and the instruction cache 30 stores the output of the instruction register 40.

The cache control signal generating circuit 43 shown in FIG. 12 is to generate a control signal for storing the output of the instruction register 40 to the instruction cache 30 when data of one block is stored in the instruction register 40 after the read request to the memory 22 is outputted from the instruction cache 30. At this time, it may be also constituted so as to store the output of the memory 22 directly without resort to the instruction register 40.

In the instruction cache, when branching occurs, it is highly possible that the instruction of the branch destination is not stored in the cache. Accordingly, as in the instruction cache memory with advance read function of the fourth preferred embodiment, by transferring the instruction of the branch destination in advance to the instruction cache, possibility of lowering of the cache error is lowered, and it is effective to lead to enhancement of the system performance.

Furthermore, when the branch signal existing in the read block is an absolute branch instruction of PC relative branch instruction high in probability of branching off, by transferring the branch destination block from the memory 22 as the main memory to the instruction cache 30, the branch destination block may be fetched into the instruction cache 30 efficiently.

<Fifth preferred embodiment>

If the branch destination block including the instruction at the branch destination is in the cache memory, it is not necessary to read out the block from the memory 22. By thus constituting, it is detected if the block including the instruction at the branch destination is present in the cache or not, and when already present, it is controlled so as not to read out.

FIG. 17 is a block diagram showing a constitution of an instruction cache memory with advance read function in a fifth preferred embodiment of the invention. As shown in the diagram, the read control section 4 outputs the read address transferred from the selector 33 to the register 44 and the read request from the instruction analysis section 6 to the instruction cache 30 as a pseudo access request equivalent to the access request from the CPU 18. The other constitution is same as that of the instruction cache memory with advance read function of the fourth preferred embodiment shown in FIG. 11.

Figure 18:
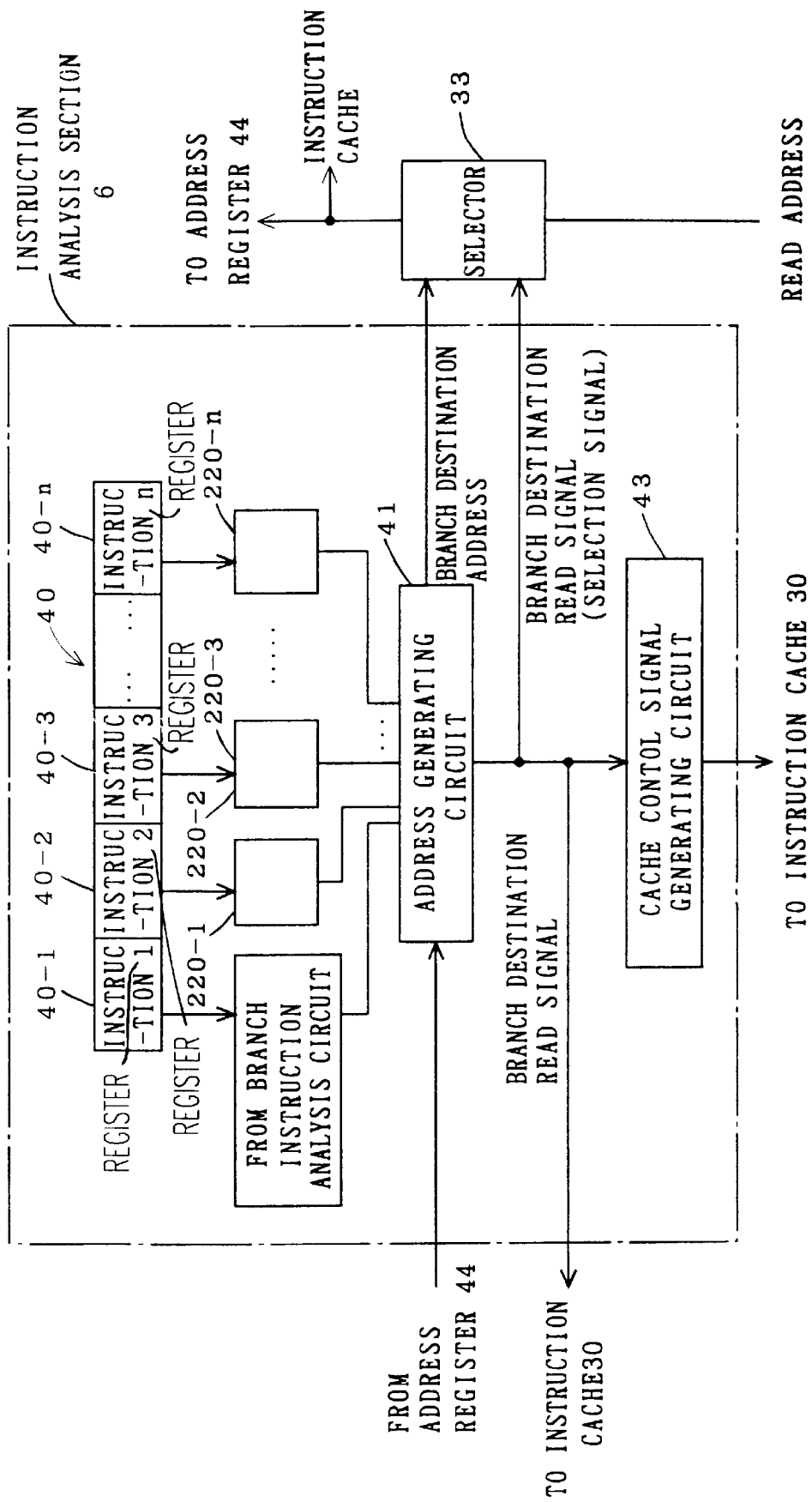
FIG. 18 is a block diagram showing an internal structure of an instruction analysis section of the fifth preferred embodiment.

FIG. 18 is a block diagram showing an internal structure of the instruction analysis section 6 and selector 33 in FIG. 17.

To realize the above function, the address as the output of the selector 33 and the branch destination read signal outputted from the address generating circuit 41 in the instruction analysis section 6 are given as pseudo access request equivalent to the access request to the instruction cache 30 given usually from the CPU 18. Furthermore, the branch destination read signal outputted from the address generating circuit 41 is given to the selector 33 as selection signal, but not given to the memory 22. Besides, the read signal generating circuit 49 is removed. The other constitution is same as that of the instruction analysis section 5 in the fourth preferred embodiment shown in FIG. 12.

The basic operation of the instruction analysis section 6 in the fifth preferred embodiment is same as in FIG. 12. Only the different points are shown below.

1. The branch destination address calculated in the address generating circuit 41 is selected by the selector 33 which receives the branch destination read signal, and is sent into the instruction cache 30. The branch destination read signal which is the output of the address generating circuit 41 is sent into the instruction cache 30. That is, the branch destination read signal and branch destination address outputted from the address generating circuit 41 are sent to the instruction cache 30 by pseudo access request.

By pseudo access request, the instruction cache 30 makes an ordinary cache error when the branch destination block including the branch destination address is not present in the instruction cache 30, and the read request is outputted to the instruction analysis section 6, and the read address is outputted to the selector 33, thereby fetching the content of the branch destination block from the memory 22.

2. On the other hand, if a branch destination block is present in the instruction cache 30, the read request and read address are not outputted, and hence the branch destination block will not be fetched from the memory 22.

Thus, in the fifth preferred embodiment, by constituting the instruction analysis section 6, only when the branch instruction is present in the read block and branch destination block including branch destination address is not present in the instruction cache 30, the branch destination block is transferred from the memory 22 into the instruction cache 30.

As a result, although the branch destination block is already present in the instruction cache 30, memory access of the branch destination block is not effected from the memory 22 to the instruction cache 30, so that efficiency memory access is realized.

<Sixth preferred embodiment>

Figure 19:
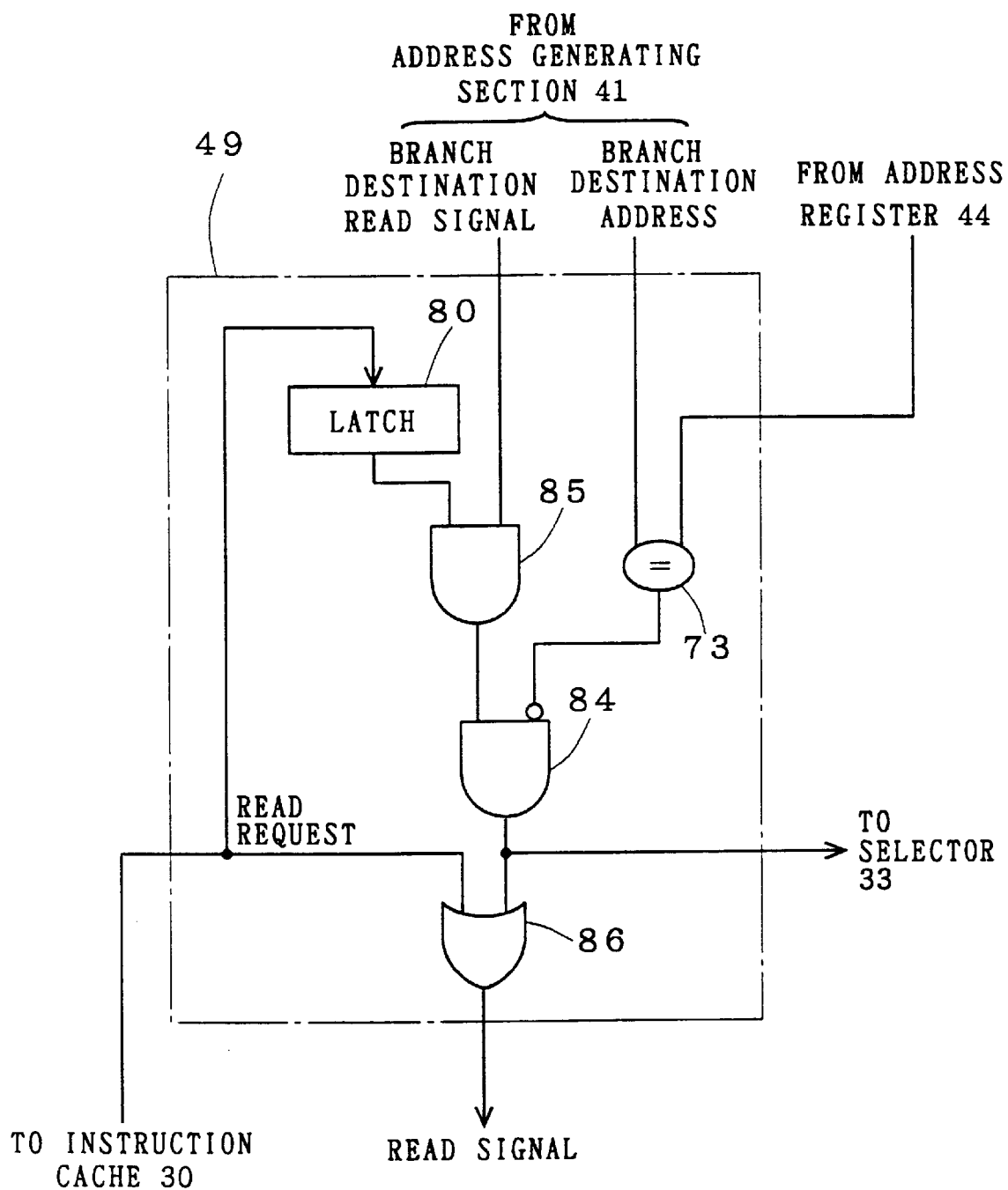
FIG. 19 is a block diagram showing an internal structure of a read signal generating circuit in an instruction cache memory with advance read function in a sixth preferred embodiment of the invention.

FIG. 19 is a block diagram showing a read signal generating circuit 49 of an instruction cache memory with advance read function in a sixth preferred embodiment of the invention. The entire constitution of the sixth preferred embodiment is same as that of the fourth preferred embodiment shown in FIG. 11, and the internal structure of the instruction analysis section 5 is same as in the fourth preferred embodiment shown in FIG. 12.

It is also possible that the branch destination block be equal to the read block being read out presently. In this case, it is a mere waste to read out the same block again. The instruction cache memory with advance read function in the sixth preferred embodiment is provided with the function for saving such waste.

The basic constitution is same as that of the instruction cache memory with advance read function of the first preferred embodiment shown in FIG. 11, except that the branch destination address as the output of the address generating circuit 41 in FIG. 11 and the output of the address register 44 must be added as the inputs to the read signal generating circuit 49.

The difference from the read signal generating circuit 49 in the first preferred embodiment shown in FIG. 16 is explained by reference to FIG. 19. The read signal generating circuit 49 in the sixth preferred embodiment is based on the constitution of the read signal generating circuit 49 in FIG. 16, combined with a comparator 73 for receiving the output of the address register 44 and branch destination address as the output of the address generating circuit 41, and an AND gate 84 connected to an OR gate 86 for receiving the negation of the output of the comparator 73 and the output of the AND gate 85.

The basic operation is same as in the read signal generating circuit 49 in FIG. 16. Only the different points are explained.

1. The comparator 73 compares the branch destination address calculated in the address generating circuit and the address in the address register. The output of the comparator 73 inverts the signal, and is given to the AND gate 84.

2. The AND gate 84 calculates the AND of the output of the AND gate 85 and the inverted signal of the output of the comparator 73, and generates a read signal for reading the instruction of the branch destination when the addresses are not equal and branch instruction is included in the read block. This signal becomes a selection signal to the selector 33.

3. The OR gate 86 calculates the OR of the output of the AND gate 84 and the latch 80, and generates a read signal to the memory 22 if there is a read signal from the instruction cache 30, or if it is necessary to read out the branch destination block including the branch destination instruction in the next cycle when there is a read signal from the instruction cache.

In this way, according to the sixth preferred embodiment of the invention, by constituting the read signal generating circuit 49, in addition to the effects of the fourth embodiment, wasteful memory access is avoided in the case an instruction of branch destination is included in the read block being presently read out, so that there is no effect on the succeeding memory access. Therefore, more efficiently, the branch destination block can be transferred to the instruction cache 30.

<Seventh preferred embodiment>

Figure 20:
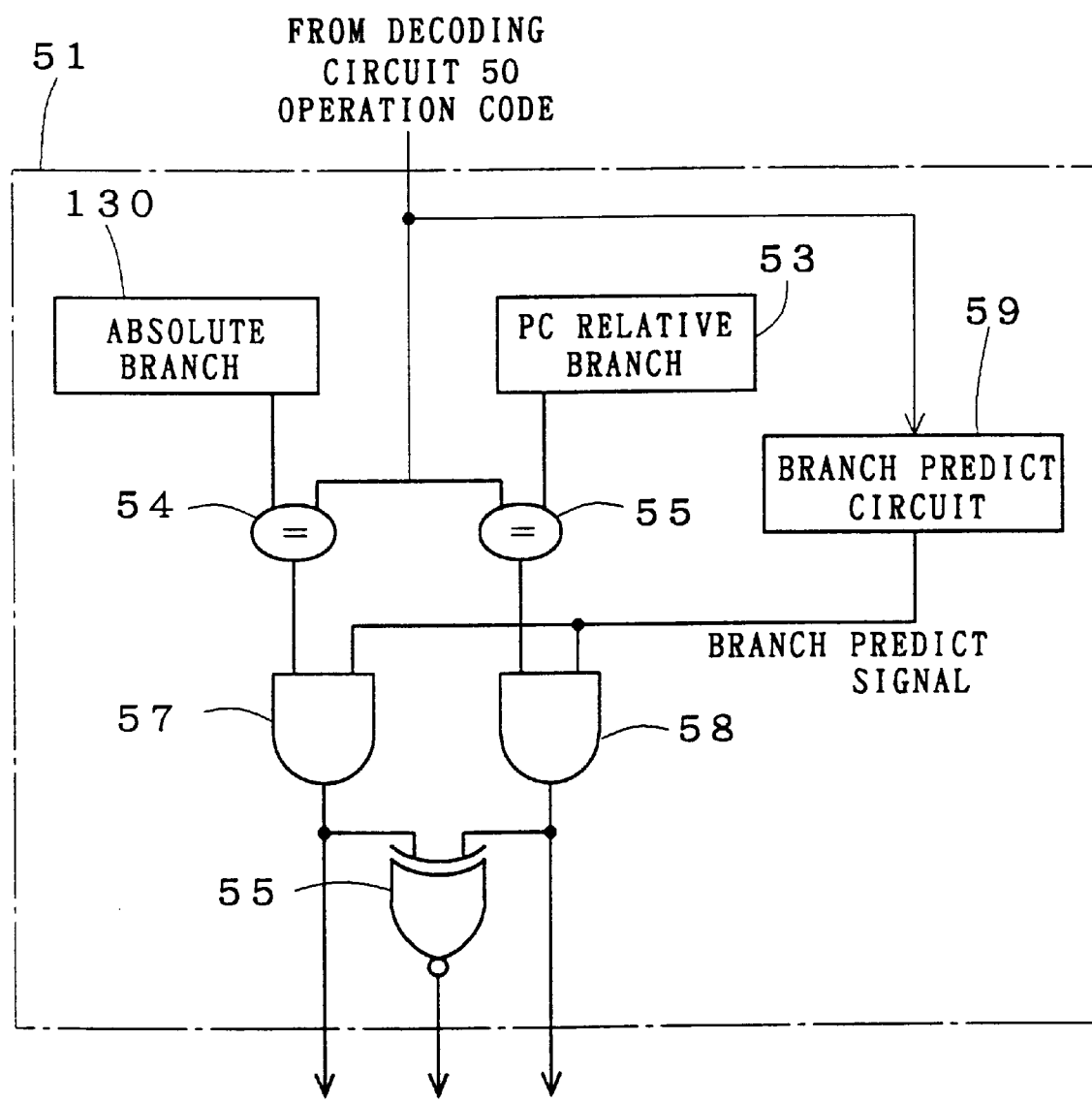
FIG. 20 is a block diagram showing an internal structure of an analysis section in a branch instruction analysis circuit in an instruction cache memory with advance read function in a seventh preferred embodiment of the invention.

FIG. 20 is a block diagram showing a constitution of an analysis section 51 included in a branch instruction analysis circuit 220-m of an instruction cache memory with advance read function in a seventh preferred embodiment of the invention. The entire structure of the seventh preferred embodiment is same as the constitution of the fourth preferred embodiment shown in FIG. 11, while the internal structure of the instruction analysis section 5 is same as in the fourth preferred embodiment shown in FIG. 12.

A branch destination instruction does not always branch. When not branching, it is not necessary to fetch in the instruction of branch destination into the cache memory. Whether the branch signal branches off or not can be predicted to a certain extent. It is hence the seventh preferred embodiment that is combined with a function for predicting to a certain extent and reading in when considered to be necessary, instead of always reading the branch destination block including the instruction of branch destination into the cache whenever branch signal is given.

The basic constitution is same as in the analysis section 51 in the first preferred embodiment shown in FIG. 14. The difference from the analysis section 51 in FIG. 14 is explained by reference to FIG. 20. The analysis section 51 of the seventh preferred embodiment is based on the constitution in FIG. 14, being further combined with a branch predict circuit 59 for receiving an operation code which is the output of the decoding circuit 50, and generating a branch predict signal, an AND gate 57 for receiving the branch predict signal and output of the comparator 54 to calculate the AND, and an and gate 58 for receiving the branch predict signal and the output of the comparator 85 and calculate the AND. Accordingly, the outputs of the AND gates 57 and 58 are inputs to an XNOR gate 56. Therefore, the signal for expressing the type consists of three bits, comprising the outputs of the AND gates 57, 58 and XNOR gate 56, and the type of the instruction is expressed by the output of the AND gate 57 as the first bit, the output of the AND gate 58 as the second bit, and the output of the XNOR gate 56 as the third bit. That is, when the value of the signal is "1", it means absolute branch, when "2", it is PC relative branch, and when "4", it is not branch instruction.

The basic operation is same as in the operation of the analysis section 51 in FIG. 14. Only the different points are given below.

1. The branch predict circuit 59 investigates the operation code, and generates a branch predict signal when predicted to branch off.

2. The AND gate 57 calculates the AND of the output of the comparator 54 for comparing if the operation code is equal to the absolute branch or not, and the branch predict signal, and when the operation code is the absolute branch instruction and it is predicted to branch off, it generates a signal showing that it is an absolute branch instruction necessary for reading out the branch destination block.

3. The AND gate 58 calculates the AND of the output of the comparator 55 for comparing if the operation code is equal to the PC relative branch or not, and the branch predict signal, and when the operation code is the PC relative branch instruction and it is predicted to branch off, it generates a signal showing that it is a PC relative branch instruction necessary for reading out the branch destination block.

Figure 21:
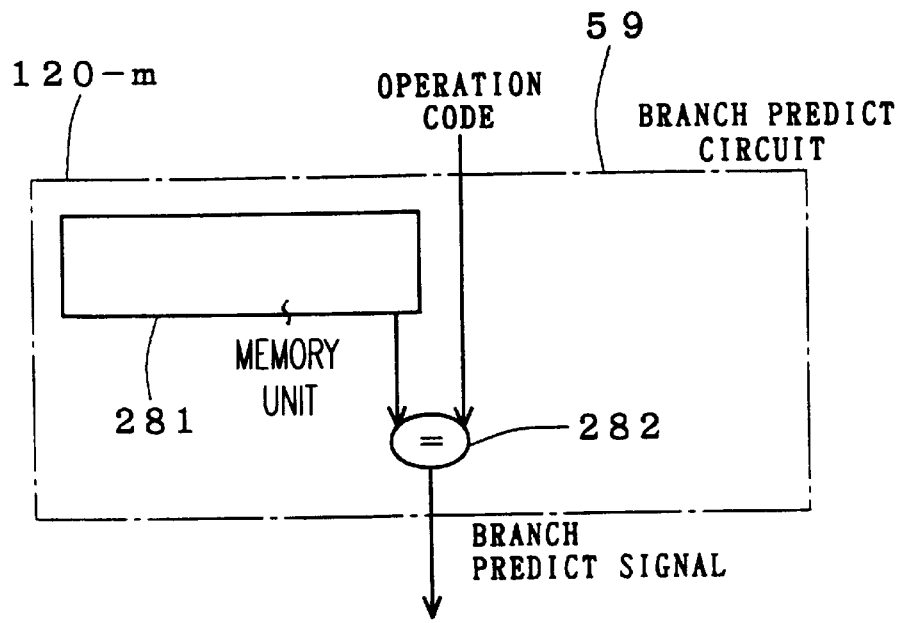
FIG. 21 is a block diagram showing an internal structure of a branch predict circuit in the analysis section of the seventh preferred embodiment.

Hereinafter the internal structure of the branch predict circuit 59 is described by reference to FIG. 21. In FIG. 21, the branch predict instruction is determined preliminarily. The branch predict circuit 59 is composed of a memory unit 281 for storing the branch predict instruction, and a comparator 282 for receiving the output of the comparator 281 and the operation code.

The operation of the branch predict circuit 59 is described below.

1. A branch predict instruction meaning a branch instruction predicted to branch off is determined preliminarily. For example, it is specified to be a branch predict instruction when the first bit to the third bit of the bit row of the instruction are all 1.

2. In the memory unit 281 for storing the branch predict instruction, the predetermined branch predict instruction is stored. For example, as determined in step 1, supposing the instruction to be a branch predict instruction when the first to third bits are 1, the data being 1 from the first to third bits is stored in the memory 281.

3. In the comparator 282, comparing the operation code and the value of the memory unit 281, when the instruction is a branch predict instruction, a branch predict signal is generated. For example, when the branch predict instruction is set as mentioned above, in the comparator 282, the first bit of the operation code is compared with the first bit of the memory unit 281, and similarly the second bit and third bit are compared, and when all are in coincidence, it is judged to be a branch predict instruction, and a branch predict signal is generated.

In this way, the branch predict instruction is generated as an instruction, and the branch predict circuit is composed as shown in FIG. 21, and hence the instruction is detected to be a predetermined branch predict instruction or not. Adding such function, the instruction cache memory with advance read function of the seventh preferred embodiment does not read out the branch destination block from the memory when the branch instruction is predicted not to branch off, and wasteful memory access is avoided, and there is no effect on the succeeding memory access. Hence more efficiently, the branch destination block can be transferred to the instruction cache 30.

<Eighth preferred embodiment>

Figure 22:
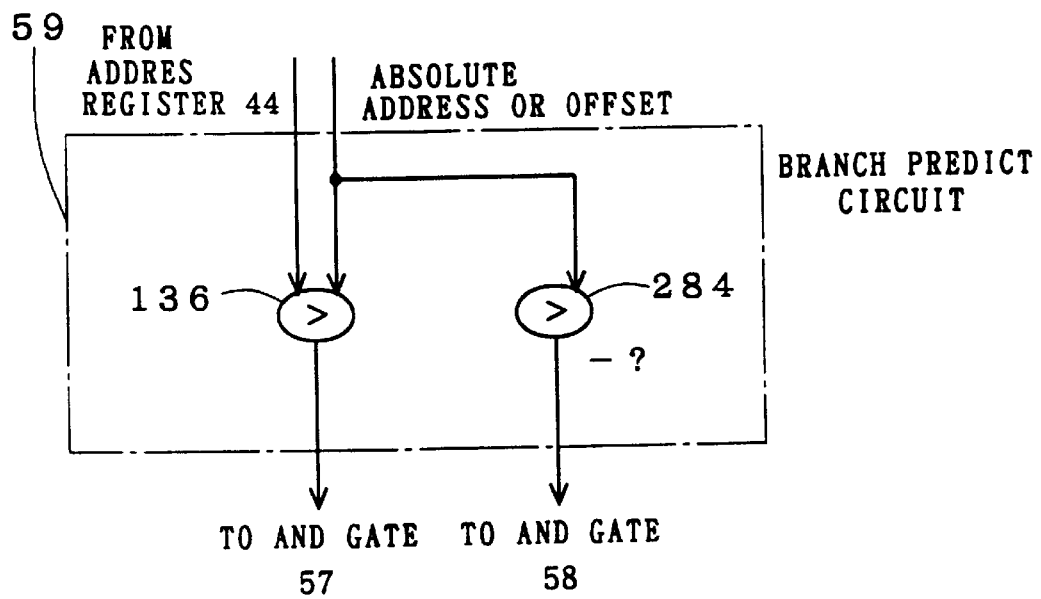
FIG. 22 is a block diagram showing an internal structure of a branch predict circuit in an analysis section in a branch instruction analysis circuit in an instruction cache memory with advance read function in an eighth preferred embodiment of the invention.

FIG. 22 is a block diagram showing a constitution of a branch predict circuit 59 of an instruction cache memory with advance read function in an eighth preferred embodiment of the invention. The entire constitution of the eighth preferred embodiment is similar to the constitution of the fourth preferred embodiment in FIG. 4, and the internal structure of the instruction analysis section 5 is similar to the fourth preferred embodiment in FIG. 4.

Generally, when the branch instruction is forward branch, branching occurs at a probability of about 50%, and in the case of backward branch, branching occurs at a considerably high probability. Accordingly, in the case of backward branch, predicting it to branch off, it may be handled as a branch predict instruction. FIG. 22 shows the branch predict signal is generated when the branch instruction is backward branch.

To realize this function, in the constitution of the analysis section 51 shown in FIG. 20, the output of the address register 44 in FIG. 11 and the absolute address or the offset as the output of the decoding circuit in FIG. 13 are further entered in the branch predict circuit 59. The branch predict circuit 59 in the eighth embodiment shown in FIG. 22 comprises a subtractor 283 which receives the output of the address register 44 shown in FIG. 11 and the output of the decoding circuit 50 shown in FIG. 13, and connects the result of subtraction to the AND gate in FIG. 20, and a comparator 284 which receives the output of the decocting circuit 50 in FIG. 13, and connects the result of comparison to the AND gate 58 in FIG. 20.

The operation of this circuit is described below.

1. The subtractor 283 subtracts the absolute address which is the output of the decoding circuit 50 in FIG. 13 from the address of the branch destination block which is the output of the address register 44 in FIG. 11, and if the value is positive, it is regarded as backward branch, and the branch predict signal is outputted to the AND gate 57 of FIG. 20.

2. The comparator 284 compares to see if the offset or the output of the decoding circuit 50 in FIG. 13 is negative or not, and if negative, it is regarded as backward branch and the branch predict signal is outputted to the AND gate 58 in FIG. 20.

Generally, when the branch instruction is forward branch, branching occurs at a probability of about 50%, and in the case of backward branch, branching occurs at a considerably high probability. Accordingly, in the case of backward branch, predicting it to branch off, it may be handled as a branch predict instruction. By thus constituting, the branch predict circuit 59 in the eighth preferred embodiment brings about the same effects as in the seventh preferred embodiment without having to set the branch predict instruction as required in the branch predict circuit 59 in the seventh preferred embodiment.

<Ninth preferred embodiment>

Figure 23:
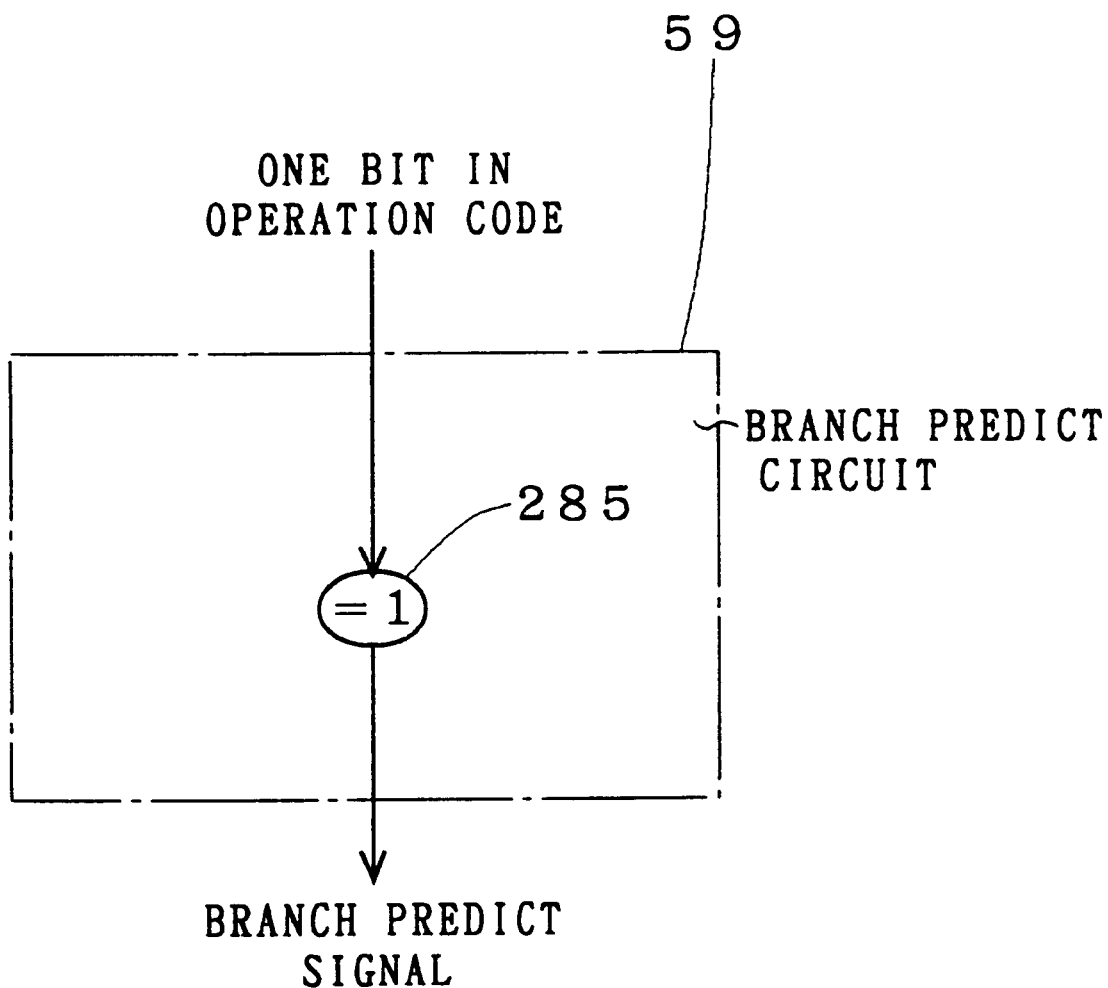
FIG. 23 is a block diagram showing an internal structure of a branch predict circuit in an analysis section in a branch instruction analysis circuit in an instruction cache memory with advance read function in a ninth preferred embodiment of the invention.

FIG. 23 is a block diagram showing a constitution of a branch predict circuit 59 of an instruction cache memory with advance read function in a ninth preferred embodiment of the invention. The entire constitution of the ninth preferred embodiment is similar to the constitution of the fourth preferred embodiment shown in FIG. 11, and the internal structure of the instruction analysis section 5 is same as in the fourth preferred embodiment in FIG. 12.

In the first place, a branch information bit for specifying to read out the branch destination block from the main memory is added to the branch instruction of high possibility of reading out the branch destination block from the main memory. It is the ninth preferred embodiment that the instruction analysis section 5 detects if the branch information bit is set up on the branch instruction or not to output the branch predict signal on the basis of the result.

To realize this function, the branch predict circuit 59 in the ninth embodiment shown in FIG. 23 comprises a comparator 285 which receives one bit (branch information bit) in the operation code, and checks if the branch information bit is "1" or not, and outputs a branch predict signal on the basis of the comparison result.

Therefore, the branch predict circuit 59 in the ninth preferred embodiment 9 operates as follows.

The comparator 285 checks if the operation code is "1" or not, and outputs a branch predict signal if "1", and does not otherwise.

By thus constituting, the branch predict circuit 59 of the ninth preferred embodiment outputs a branch predict signal only by comparing the operation code of one bit, and the same effects as in the seventh and eighth preferred embodiments may be obtained.

<Tenth preferred embodiment>

Figure 24:
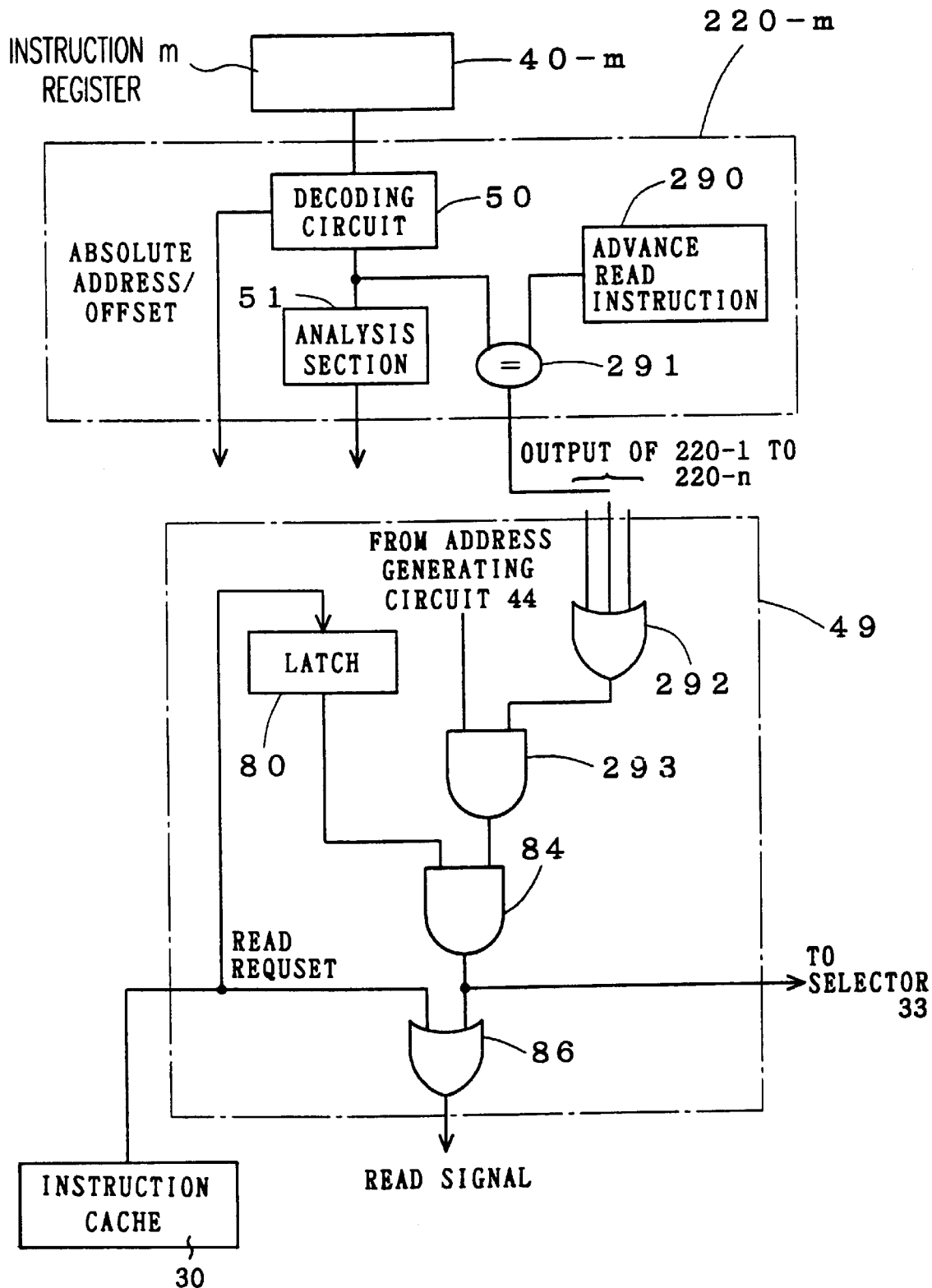
FIG. 24 is a block diagram showing an internal structure of a branch instruction analysis circuit and a read signal generating circuit in an instruction cache memory with advance read function in a tenth preferred embodiment of the invention.
Figure 25:
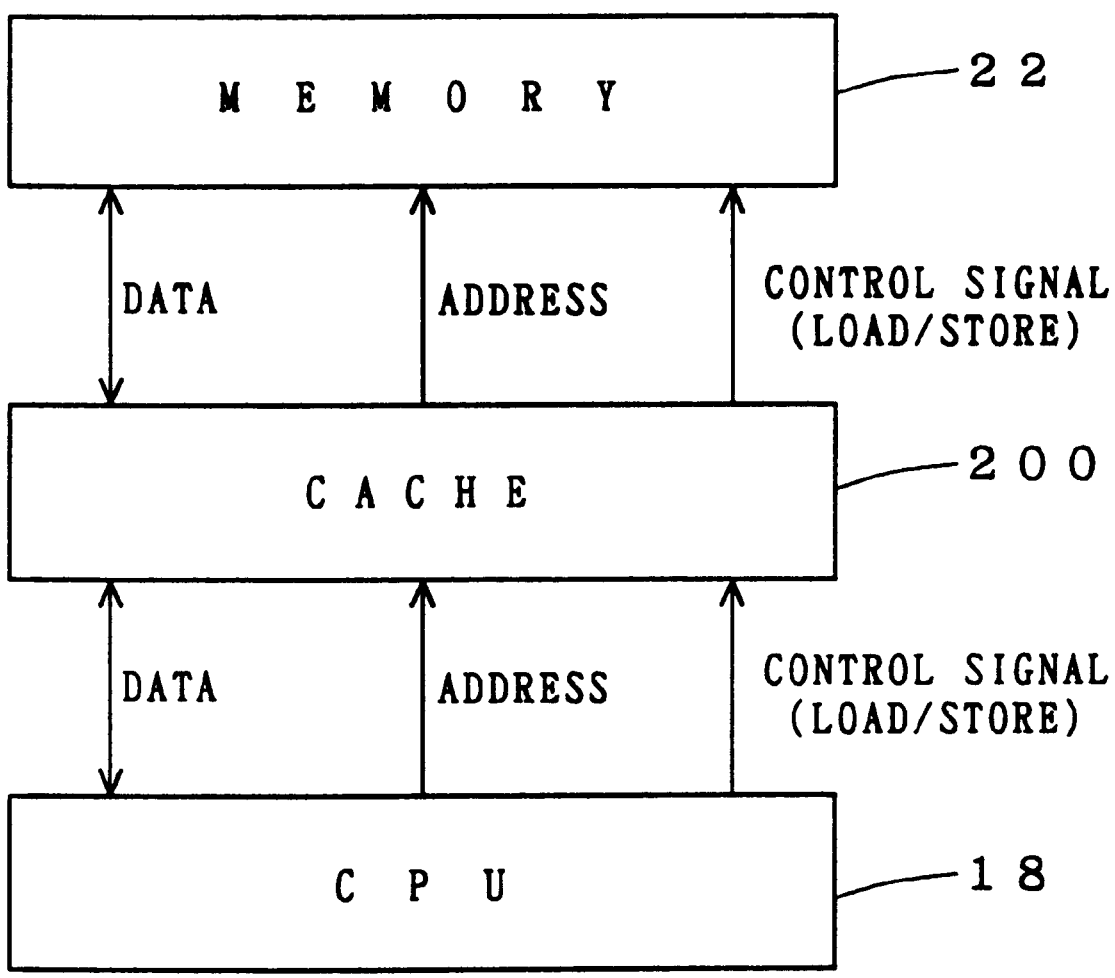
FIG. 25 is a block diagram showing a conventional system with a cache memory and a main memory layers.

FIG. 24 is a block diagram showing a constitution of a branch instruction analysis circuit 220-m and a read signal generating circuit 49 in an instruction cache memory with advance read function in a tenth preferred embodiment of the invention. The entire constitution of the tenth preferred embodiment is similar to the constitution of the fourth preferred embodiment shown in FIG. 11, and the internal structure of the instruction analysis section 5 is similar to the fourth preferred embodiment shown in FIG. 12.

In the tenth preferred embodiment, an advance read instruction showing the branch destination block is to be read is preliminarily inserted into the same block as the branch instruction required to read out the block including the instruction of branch destination.

The branch instruction analysis circuit 220-m is based on the constitution of the branch instruction analysis circuit 220, combined with a function for judging whether the instruction is an advance read instruction or not. The branch instruction analysis circuit 220-m further adds, aside from the constitution in FIG. 13, a memory unit 290 for storing the operation code of the advance read instruction, and a comparator 291 for receiving the output of the memory unit 290 and the operation code or the output of the decoding circuit 50, and outputting the result of comparison.

The read signal generating circuit 49 in the tenth preferred embodiment is based on the constitution of the read signal generating circuit 49 shown in FIG. 16, further combined with an OR gate 292 for receiving the output of the comparator 291 of the branch instruction analysis circuits 220-1 to 220-n, and an AND gate for receiving the branch instruction read signal as the output of the address generating circuit 41 in FIG. 11 and the output of the OR gate 93, thereby changing the output of the AND gate 293 to the input of the And gate 84.

The operation of the tenth preferred embodiment is described below.

1. The comaprator 291 of the branch instruction analysis circuit 220-m compares the operation code obtained from the decoding circuit 50 and the output of the memory unit 290, and generates an advance read instruction signal sowing the advance read instruction when the instruction is an advance read instruction.

2. The OR gate 292 of the read signal generating circuit 49 calculates the OR of the output of the comparator 291 of the branch instruction analysis circuits 220-1 to 220-n, and tells the AND gate 293 if there is advance read instruction or not in the block.

3. The AND gate 293 calculates the AND of the branch instruction read signal as the output of the address generating circuit 41 in FIG. 11 and the output of the OR gate 292, and generates a signal showing it is necessary to read the branch destination block, and transfers to the AND gate 85.

By thus constituting, it is necessary to read out the branch destination block only when an advance read instruction is present in the read block, and wasteful memory access is avoided, and there is no effect on the succeeding memory access. Therefore, the branch destination block can be more efficiently transferred to the instruction cache 30.

That is, by including the advance read instruction in the block preliminarily known to branch off, in the block high in such probability, or in the block required to read out the branch destination or high in such necessity, the branch destination block can be read out conveniently to be ready for access.

While the invention has been shown and described in detail, the foregoing description is in all aspects illustrative and not restrictive. It is therefore understood that numerous modifications and variations can be devised without departing from the scope of the invention.

We claim:

1. An instruction cache memory with advance read function comprising:

an instruction auxiliary memory device connected between a main memory and a processing device for buffering a difference in an operation speed thereof, which responds to an access request provided from said processing device, when holding inside block information indicated by the access request, giving said block information to said processing device, and when not holding, receiving said block information from said main memory and holding it;

instruction analysis means connected between said main memory and said instruction auxiliary memory device for analyzing an instruction included in block information that is read out from said main memory as a read block and transferred to said instruction auxiliary memory device, and predicting whether it is necessary to read out a next block succeeding said read block from said memory; and next block read means connected between said main memory and said instruction auxiliary memory device for reading out said next block from said main memory, when said instruction analysis means predicts it is to read out said next block, thereby storing the next block into said instruction auxiliary memory device, including:

an address register coupled to said main memory and configured to hold address information corresponding to a block of said main memory, said address register configured to provide said address information to said main memory in response to said access request being provided from said processing device;

a counter configured to calculate an incremented address value that corresponds with a sum of a size of said block unit and said address information held in said address register; and a selector configured to be controlled by a selector control signal that is output from said instruction analysis means, said selector providing said incremented address value to said address register when said instruction analysis means judges that a branch predict instruction predicted to result in a branch operation is not present in said read block.

2. An instruction memory cache with advance read function of claim 1, wherein said instruction analysis means comprises prediction means for detecting whether said instruction corresponds to a branch predict instruction which is predicted to result in a branch operation that branches to a region outside of said read block and said next block, and for predicting whether it is necessary to read out said next block.

3. An instruction memory cache with advance read function of claim 1, wherein said instruction analysis means comprises:

branch predict instruction detecting means for detecting from said read block whether said instruction corresponds to a branch predict instruction which is predicted to result in a branch operation;

forward branch judging means for judging whether said branch predict instruction corresponds to a forward branch operation that branches to an address larger than a current address; and predict means for predicting whether it is necessary to read out said next block when said branch judging means judges that said branch predict instruction corresponds to said forward branch operation.

4. An instruction memory cache with advance read function of claim 1, wherein a specific instruction is predetermined, and said instruction analysis means comprises predict means for detecting the presence of said specific instruction in said read block, and predicting it is necessary to read out said next block.

5. An instruction cache memory with advance read function comprising:

an instruction auxiliary memory device connected between a main memory and a processing device for buffering a difference in an operation speed thereof, which responds to an access request provided from said processing device, when holding inside block information indicated by the access request, giving said block information to said processing device, and when not holding, receiving said block information from said main memory and holding it;

instruction analysis means connected between said main memory and said instruction auxiliary memory device for analyzing an instruction included in block information that is read out from said main memory as a read block and transferred to said instruction auxiliary memory device, calculating a branch destination address when a branch instruction is included in said instruction, and judging whether it is necessary to read out a branch destination block which is a block including another instruction including said branch destination address from said main memory;

next block read means connected between said main memory and said instruction auxiliary memory device for reading out said branch destination block from said main memory, when said instruction analysis means judges it is necessary to read out said branch destination block, thereby storing said branch destination block into said instruction auxiliary memory device, including:

an address register connected to said main memory and configured to hold address information corresponding to a particular block of memory located in said main memory, said address register configured to provide said address information to said main memory in response to said access request being provided from said processing device; and a selector configured to be controlled by an address selection signal output from said instruction analysis means, said selector providing said branch destination address to said address register when said instruction analysis means judges that a branch predict instruction predicted to result in a branch operation is present in said read block, and said selector providing a read address as provided from said processing device when said instruction analysis means judges that the branch predict instruction is not present in the read block.

6. An instruction memory cache with advance read function of claim 5, wherein said instruction analysis means comprises judging means for judging whether it is necessary to read out said branch destination block from said main memory when said branch instruction is one of an absolute branch instruction and a program counter relative branch instruction, but not conditional branch instruction.

7. An instruction memory cache with advance read function of claim 5, wherein said instruction analysis means comprises judging means for judging it is necessary to read out said branch destination block from said main memory when said branch destination address is an address out of the region of said read block.

8. An instruction memory cache with advance read function of claim 5, wherein said instruction analysis means comprises:

branch predict means for predicting whether the branch instruction is more likely than not to execute a branch operation; and judging means for judging whether it is necessary to read out said branch destination block from said main memory when said branch predict means predicts that a branching possibility of said branch instruction is more likely than not.

9. An instruction memory cache with advance read function of claim 8, wherein said branch predict means comprises memory means for storing selected types of said branch instruction having a common attribute of being more likely than not to execute a branch operation, said branch predict means predicting that the branching possibility of said branch instruction is more likely than not when said branch instruction is one of said selected types that is stored in said memory means.

10. An instruction memory cache with advance read function of claim 8, wherein said branch predict means predicts that the branching possibility of said branch instruction is high when said branch destination address is smaller than the address in which said branch instruction is stored.

11. An instruction memory cache with advance read function of claim 8, wherein a type of branch instruction that is more likely than not to execute a branch operation is preliminarily provided with branch information of specific bits for indicating that the branching possibility is high, and said branch predict means predicts that the branching possibility of said branch instruction is high when said branch information is found in said branch instruction.

12. An instruction memory cache with advance read function of claim 5, wherein a specific instruction is predetermined, and said instruction analysis means comprises judging means for judging whether it is necessary to read out said branch destination block from said main memory when detecting whether said specific instruction in said read block is present.

13. An instruction memory cache with advance read function comprising:

an instruction auxiliary memory device connected between a main memory and a processing device for buffering a difference in an operation speed thereof, which responds to an access request provided from said processing device, when holding inside block information indicated by the access request, giving said block information to said processing device, and when not holding, receiving said block information from said main memory and holding it, said instruction auxiliary memory device configured to fetch block information from said main memory when the information of the block unit indicated by said access request is not already held; and advance read control means connected between said main memory and said instruction auxiliary memory device for analyzing an instruction included in block information that is read out from said main memory as a read block and transferred into said instruction auxiliary memory device, for calculating a branch destination address when a branch instruction is included, and for outputting a pseudo access request equivalent to said access request for instructing to read out a branch destination block which is a block containing an instruction of a corresponding branch destination address, including:

a selector controllably configured to output to said main memory and said processing device one of said branch destination address and the information of the block unit indicated by the access request from the processing device; and an address generating circuit configured to control said selector by applying a selection signal thereto and to said processing device.

14. An instruction cache memory with advance read function comprising:

an instruction auxiliary memory device connected between a main memory and a processing device for buffering a difference in an operation speed thereof, which responds to an access request provided from said processing device, when holding inside block information indicated by the access request, giving said block information to said processing device, and when not holding, receiving said block information from said main memory and holding it;

instruction analysis means connected between said main memory and said instruction auxiliary memory device for analyzing an instruction included in block information that is read out from said main memory as a read block and transferred to said instruction auxiliary memory device, and predicting whether it is necessary to read out a next block succeeding said read block from said memory: and next block read means connected between said main memory and said instruction auxiliary memory device for reading out said next block from said main memory when said instruction analysis means predicts it is to read out said next block, thereby storing the next block into said instruction auxiliary memory device, including:

an address register coupled to said main memory and configured to hold address information corresponding to a block of said main memory, said address register configured to provide said address information to said main memory in response to said access request being provided from said processing device;

a counter configured to calculate an incremented address value that corresponds with a sum of a size of said block unit and said address information held in said address register; and a selector configured to be controlled by a selector control signal that is output from said instruction analysis means, said selector providing said incremented address value to said address register when said instruction analysis means judges that a branch predict instruction predicted to result in a branch operation is not present in said read block; and said instruction analysis means comprising prediction means for detecting whether there is said branch predict instruction in said read block, and for predicting whether it is necessary to read out said next block, said selector not providing said incremented address value when said instruction analysis means predicts that said branch predict instruction is present in said read block.

* * * * *